(12) United States Patent
Matsui

(10) Patent No.: US 7,453,783 B2
(45) Date of Patent: Nov. 18, 2008

(54) INFORMATION STORAGE APPARATUS

(75) Inventor: Masakatsu Matsui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 134 days.

(21) Appl. No.: 11/515,923

(22) Filed: Sep. 6, 2006

(65) Prior Publication Data

US 2007/0091745 A1   Apr. 26, 2007

Related U.S. Application Data

(62) Division of application No. 11/150,348, filed on Jun. 13, 2005, now Pat. No. 7,120,103, which is a division of application No. 09/855,700, filed on May 16, 2001, now Pat. No. 6,930,964.

(30) Foreign Application Priority Data

May 30, 2000   (JP) ............................. 2000-159986

(51) Int. Cl.
*G11B 27/36*   (2006.01)
(52) U.S. Cl. ............... 369/53.31; 369/53.36; 369/47.32
(58) Field of Classification Search ............. 369/53.31, 369/53.35, 53.36, 47.44, 47.32
See application file for complete search history.

(56) References Cited

U.S. PATENT DOCUMENTS

| | | | |
|---|---|---|---|
| 4,669,072 A | 5/1987 | Miura et al. | |
| 5,012,461 A | 4/1991 | Yoshida et al. | |
| 5,224,087 A | 6/1993 | Maeda et al. | |
| 5,295,124 A | 3/1994 | Shirako | |
| 5,301,041 A | 4/1994 | Noda et al. | |
| 5,363,360 A | 11/1994 | Fairchild | |
| 5,363,361 A | 11/1994 | Bakx | |
| 5,491,676 A | 2/1996 | Yamaguchi et al. | |
| 5,737,481 A * | 4/1998 | Gushima et al. | ............ 386/113 |
| 5,771,214 A | 6/1998 | Saga | |
| 6,061,313 A | 5/2000 | Shigemori | |
| 6,141,306 A | 10/2000 | Andoh | |

(Continued)

FOREIGN PATENT DOCUMENTS

EP   0 432 863 A2   6/1991

(Continued)

OTHER PUBLICATIONS

European Search Report dated Jan. 22, 2004.

*Primary Examiner*—Thang V Tran
(74) *Attorney, Agent, or Firm*—Dickstein Shapiro LLP

(57) ABSTRACT

An information storage apparatus records, reproduces and/or erases information with respect to a recording medium. The apparatus includes a servo error generation detector for detecting a generation of a servo error based on at least one of servo signals including a focus error signal and a tracking error signal which are derived from output signals of a light receiving element, and a data recording resuming section for temporarily interrupting a data recording with respect to the recording medium, temporarily turning OFF a servo and then turning ON the servo again, to thereafter synchronize recording data to recorded data already recorded on the recording medium, and resume recording of the recording data continuing without a discontinuity to an end of the recorded data recorded immediately before the interruption of the data recording, when the generation of the servo error is detected while recording data on the recording medium.

5 Claims, 18 Drawing Sheets

U.S. PATENT DOCUMENTS

| | | |
|---|---|---|
| 6,266,308 B1 | 7/2001 | Andoh |
| 6,438,083 B1 | 8/2002 | Kroon |
| 6,487,616 B1 | 11/2002 | Hayashi |
| 6,496,458 B2 | 12/2002 | Tsukihashi |
| 6,584,053 B1 * | 6/2003 | Tsukihashi ............... 369/53.34 |
| 6,587,416 B1 | 7/2003 | Tsukihashi |
| 6,594,213 B1 | 7/2003 | Hayashi |
| 6,643,233 B1 | 11/2003 | Yen et al. |
| 6,754,148 B2 | 6/2004 | Kim |

FOREIGN PATENT DOCUMENTS

| | | |
|---|---|---|
| EP | 0 821 356 A2 | 1/1998 |
| EP | 0 905 691 A2 | 3/1999 |
| JP | 02-172029 | 7/1990 |
| JP | 03-116443 | 5/1991 |
| JP | 4-105273 | 4/1992 |
| JP | 5-2753 | 1/1993 |
| JP | 5-151600 | 6/1993 |
| JP | 5-298736 | 11/1993 |
| JP | 08-055418 | 2/1996 |
| JP | 8-306052 | 11/1996 |
| JP | 11-273266 | 10/1999 |
| JP | 11-328830 | 11/1999 |
| JP | 2000-40302 | 2/2000 |
| JP | 2001-023176 A | 1/2001 |

* cited by examiner

INFORMATION STORAGE APPARATUS

CROSS REFERENCE TO RELATED APPLICATIONS

The present application is a divisional of U.S. application Ser. No. 11/150,348, filed on Jun. 13, 2005, now U.S. Pat. No. 7,120,103 which in turn is a divisional of U.S. application Ser. No. 09/855,700, filed May 16, 2001 (now U.S. Pat. No. 6,930,964, issued Aug. 16, 2005), the disclosures of which are herewith incorporated by reference in their entirety.

BACKGROUND OF THE INVENTION

This application claims the benefit of a Japanese Patent Application No. 2000-159986 filed May 30, 2000, in the Japanese Patent Office, the disclosure of which is hereby incorporated by reference.

1. Field of the Invention

The present invention generally relates to information storage apparatuses, and more particularly to an information storage apparatus, such as an optical disk unit and an optical card unit, which records, reproduces and/or erases information with respect to a recording medium such as an optical disk and an optical card, by converging a light beam from a semiconductor laser on the recording medium.

2. Description of the Related Art

As a first example of a conventional information storage apparatus, there is an optical disk unit which records, reproduces and/or erases information with respect to a plurality of kinds of optical disks. When recording the information in such an optical disk unit, it is extremely important that the optical disk is in a state under a stable servo, in order to avoid a write error caused by a servo error.

However, a servo signal may be distorted due to various external disturbances, and an off-servo state may occur.

Particularly when a rate at which the information is to be recorded becomes high, it becomes more difficult to carry out a stable servo.

Accordingly, an information storage apparatus which is provided with a means for reducing a light emission power of a laser diode or turning OFF the laser diode when the off-servo state occurs and a servo error is detected during the recording, so as to avoid an erroneous recording, has been proposed in a Japanese Laid-Open Patent Application No. 5-298736, for example.

As a second example of the conventional information storage apparatus, there is an optical disk unit which records, reproduces and/or erases information with respect to a plurality of kinds of optical disks. When recording the information in such an optical disk unit, it is extremely important that ATIP information included in the optical disk is accurately detected and decoded, in order to accurately perform a positioning with respect to the information which is to be recorded, and to synchronize the information which is to be recorded with respect to a rotational speed of the optical disk.

However, because a signal level of the ATIP signal is extremely small, it may be difficult to detect the ATIP signal due to various external disturbances.

Particularly when a rate with which the information is to be recorded becomes high, it becomes more difficult to detect the ATIP signal.

Accordingly, an information storage apparatus which is provided with a means for correcting a tracking error when an ATIP error rate increases during the recording, so as to reduce the ATIP error rate, has been proposed in a Japanese Laid-Open Patent Application No. 5-151600, for example.

As a third example of the conventional information storage apparatus, there is an optical disk unit which records, reproduces and/or erases information with respect to a plurality of kinds of optical disks. When recording the information in such an optical disk unit, it is important that the recording is carried out continuously without a recording error. For example, the recording error is caused by a shock, vibration or the like.

Accordingly, an information storage apparatus which is provided with a means for interrupting the recording of information when the shock, vibration or the like is detected, has been proposed in a Japanese Laid-Open Patent Application No. 11-328830, for example.

As a fourth example of the conventional information storage apparatus, there is an optical disk unit which records, reproduces and/or erases information with respect to a plurality of kinds of optical disks. When a temperature of such an optical disk unit, particularly a temperature of an optical system portion called an optical pickup, rises, a light emission characteristic of the laser diode which is used for recording the information may change, and an error may be generated during the recording. In addition, even if no error is generated during the recording, a recording quality may be deteriorated by the temperature rise. As a result, there is a possibility of recording an optical disk from which the information cannot be reproduced.

Furthermore, in a high temperature state, it is necessary to increase the light emission power of the laser diode in order to continue recording the information without deteriorating the recording quality, but a serviceable life of the laser diode may be shortened by the increased light emission power.

Accordingly, an information storage apparatus which is provided with a means for changing a converging state of a laser spot by multiplexing with a focus servo when a high temperature is detected during the recording, has been proposed in a Japanese Laid-Open Patent Application No. 8-306052, for example.

But in the first example of the conventional information storage apparatus, although it is possible to prevent an erroneous recording on the track by suppressing the light emission of the laser diode at a light emission power which would record information when the servo error is generated, there was a first problem in that the data recorded up to that point in time cannot be utilized.

Particularly in the case of a write-once optical recording medium, such as a CD-R, which can only be recorded with information once, a storage capacity of the optical recording medium may be wasted, and a time used to make the recording up to that point in time may be wasted.

On the other hand, in the above described information storage apparatus, the servo errors include a servo error detected by the tracking error signal.

When the tracking error signal detects the servo error, the focus servo may be in an on-servo state and stable. For this reason, if all of the servos are once turned OFF and then turned ON to obtain the on-servo states, there was a second problem in that it may take too much time for the servos to stabilize.

Further, in the above described information storage apparatus, when the information recording is interrupted upon detection of the servo error and the recording is to be resumed so that there is no discontinuity with the data recorded immediately before the recording was interrupted, there is a possibility that the information is recorded in the off-servo state if the servo error is actually generated. As a result, there was a third problem in that there is a possibility of deteriorating the recording quality of the optical recording medium which is recorded with the information.

Next, in the above described information storage apparatus, when the information recording is interrupted upon detection of the servo error and the recording is to be resumed so that there is no discontinuity with the data recorded immediately before the recording was interrupted, the cause of the servo error may be dependent on the rotational speed of the optical recording medium on which the information is to be recorded.

In this case, even if the information recording is interrupted upon detection of the servo error and the recording is resumed so that there is no discontinuity with the data recorded immediately before the recording was interrupted, the servo error is generated again, and a loop for interrupting and resuming the information recording is repeated, and there was a fourth problem in that the information recording may not end.

Moreover, in the above described information storage apparatus, when the information recording is interrupted upon detection of the servo error and the recording is to be resumed so that there is no discontinuity with the data recorded immediately before the recording was interrupted, there was a fifth problem in that the time finally required to record the information may become extremely long if the recording rate is changed at the first detection of the servo error, in a case where the cause of the servo error detection is other than the rotational speed of the optical recording medium.

On the other hand, in the second example of he conventional information storage apparatus, it is possible to reduce the ATIP error rate caused by the tracking error, but there is no effect on the ATIP error rate which increases due to other causes. In some cases, there was a sixth problem in that the recording is performed out of synchronism with respect to the rotational speed of the optical recording medium and a write error may be generated if the situation becomes worse.

Particularly in the case of the write-once optical recording medium, such as the CD-R, which can only be recorded with information once, the recording capacity of the optical recording medium may wasted if the write error occurs, and the time used to make the recording up to that point in time may also be wasted.

In the above described information storage apparatus, one of the causes which increase the ATIP error rate is determined by a relative position (hereinafter referred to as a lens position) of an objective lens of the optical pickup with respect to a carriage which moves the objective lens, an actuator or the like in a radial direction of the optical recording medium.

In other words, even if the ATIP error rate increases and the information recording is interrupted and resumed, there are cases where the information recording is resumed from the position of the objective lens identical to that immediately before the recording was interrupted if the carriage did not move from immediately before the interruption of the recording. In such cases, the ATIP error rate immediately after the recording is resumed is high, and the interruption and resuming of the information recording are repeated. As a result, there was a seventh problem in that the information recording may not end.

Next, in the above described information storage apparatus, when the information recording is interrupted upon detection of the increase of the ATIP error rate and the recording is to be resumed so that there is no discontinuity with the data recorded immediately before the recording was interrupted, there are cases where the increase of the ATIP error rate is dependent on the rotational speed of the optical recording medium on which the information is to be recorded. In such cases, the ATIP error rate is large for the same recording rate, even if the information recording is interrupted and resumed as the ATIP error rate increases. Consequently, there was an eighth problem in that the interruption and resuming of the information recording are repeated, and the information recording may not end.

On the other hand, in the above described information storage apparatus, when the information recording is interrupted upon detection of the increase of the ATIP error rate and the recording is to be resumed so that there is no discontinuity with the data recorded immediately before the recording was interrupted, there was a ninth problem in that the time finally required to record the information may become extremely long if the recording rate is changed at the first detection of the increase of the ATIP error rate, in a case where the cause of the increased ATIP error rate is other than the rotational speed of the optical recording medium.

In the third example of the conventional information storage apparatus, in the case of the write-once optical recording medium, such as the CD-R, which can only be recorded with information once, there was a tenth problem in that the recording capacity of the optical recording medium may wasted and the time used to make the recording up to that point in time may also be wasted, if the recording is interrupted due to the shock, vibration or the like.

Next, in the above described information storage apparatus, if the shock, vibration or the like is due to external causes, the shock, vibration or the like will be eliminated when the external causes are eliminated, to thereby enable the information recording to be resumed stably. However, if the shock, vibration or the like is due to internal causes such as a cause due to the rotational speed of the optical recording medium, the shock, vibration or the like is generated under the same conditions even when the information recording is resumed, and the interruption and resuming of the information recording may be repeated. Consequently, there was an eleventh problem in that the final recording rate may become low, and the information recording may not be resumed and completed.

Moreover, in the above described information storage apparatus, when the information recording is interrupted upon detection of the shock, vibration or the like and the recording is to be resumed so that there is no discontinuity with the data recorded immediately before the recording was interrupted, there was a twelfth problem in that the time finally required to record the information may become long if the recording rate is changed at the first detection of the shock, vibration or the like, in a case where the shock, vibration or the like is temporary because such temporary shock, vibration or the like will not be generated again.

In addition, in the above described information storage apparatus, there was a thirteenth problem in that a shock sensor is required in general to detect the shock, vibration or the like, and a redundant circuit associated therewith needs to be added.

Next, in the fourth example of the conventional information storage apparatus, an operating range of the focus servo is finite, and the converging state of the light beam can only be controlled to a predetermined level even when multiplexing is employed. Hence, the converging state cannot be controlled with respect to a temperature change in a range in which the change exceeds the predetermined level, and there was a fourteenth problem in that the recording quality deteriorates and the recording error occurs.

Particularly in the case of a write-once optical recording medium, such as the CD-R, which can only be recorded with information once, the storage capacity of the optical recording medium may be wasted, and the time used to make the recording up to that point in time may be wasted.

Moreover, in the above described information storage apparatus, if the temperature upon starting of the information recording is high from the initial state, the temperature detected during the recording naturally becomes high. For this reason, the detected temperature easily becomes greater than a predetermined high temperature, and there was a fifteenth problem in that there are possibilities that pause and rewrite of the information recording will occur frequently, and that the write will not be completed in a worst case under the high-temperature condition.

On the other hand, if the initial temperature is extremely low, there is a possibility that the recording quality will deteriorate before the predetermined high temperature is reached.

In addition, in the above described information storage apparatus, the detection of the high temperature may be caused mainly by the light emission of the laser diode which is used for the information recording and urges a temperature rise of the optical pickup. Furthermore, as the recording rate becomes high, the light emission power of the laser diode required for the information recording becomes high, and the temperature easily rises.

In other words, when the information recording is interrupted upon detection of the internal temperature rise due to the high light emission power of the laser diode required because of the high recording rate and the recording is to be resumed so that there is no discontinuity with the data recorded immediately before the recording was interrupted, there was a sixteenth problem in that the interruption and resuming of the information recording are repeated, and the information recording may not end. That is, the temperature rise occurs again for the same recording rate even when the information recording is interrupted by the temperature rise and resumed, if the cause of the temperature rise is dependent on the rotational speed of the optical recording medium on which the information is to be recorded.

Furthermore, in the above described information storage apparatus, if the cause of the detected high temperature is other than the rotational speed of the optical recording medium, the cause is not eliminated by reducing the rotational speed upon the first detection of the high temperature. Consequently, the high temperature is reached again, which results in the interruption of the recording and resuming of the recording at a reduced rotational speed, and there was a seventeenth problem in that the recording rate of the information recording may becomes extremely low.

SUMMARY OF THE INVENTION

Accordingly, it is a general object of the present invention to provide a novel and useful information storage apparatus according to the present invention, in which the problems described above are eliminated.

Another object of the present invention is to provide an information storage apparatus which eliminates at least one of the first through seventeenth problems described above.

A first object of the present invention is to provide an information storage apparatus which can continuously record data without a discontinuity and without generating a recording error, even if a servo error is generated.

A second object of the present invention is to provide an information storage apparatus which can stably and continuously record data without a discontinuity, by achieving an on-servo state at a higher speed when a servo error is detected from a tracking error signal.

A third object of the present invention is to provide an information storage apparatus which can record data with a stable quality without generating an off-servo state.

A fourth object of the present invention is to provide an information storage apparatus which can stably record data when interrupting a data recording upon detection of a servo error signal and resuming the data recording without a discontinuity with recorded data immediately before the interruption, even in a case where a cause of a servo error is dependent on a rotational speed of a recording medium on which the data are recorded.

A fifth object of the present invention is to provide an information storage apparatus which can stable record data at a speed which is as high as possible, even if a generation of a servo error is temporary or is dependent on a rotational speed of a recording medium on which the data are recorded.

A sixth object of the present invention is to provide an information storage apparatus which can continuously record data without a discontinuity and without generating a recording error, even if an ATIP error rate increases.

A seventh object of the present invention is to provide an information storage apparatus which can stably record data even in a case where an ATIP error rate increases consecutively under identical conditions such as a lens position.

An eighth object of the present invention is to provide an information storage apparatus which can stably record data even if an increase of an ATIP error rate is caused by a rotational speed of a recording medium.

A ninth object of the present invention is to provide an information storage apparatus which can stably record data at a speed which is as high as possible, even if an increase of an ATIP error rate is temporary or is dependent on a rotational speed of a recording medium on which data are recorded.

A tenth object of the present invention is to provide an information storage apparatus which can continuously record data without a discontinuity without generating a recording error, even if a fault such as shock or vibration occurs.

An eleventh object of the present invention is to provide an information storage apparatus which can stably record data, even in a case where the shock or vibration is consecutively generated under identical conditions, such as internal causes due to a rotational speed of a recording medium.

A twelfth object of the present invention is to provide an information storage apparatus which can stably record data at a speed which is as high as possible, even if the applied shock or vibration is temporary or, is consecutively generated due to internal causes.

A thirteenth object of the present invention is to provide an information storage apparatus which can detect shock, vibration or the like without the use of a shock sensor.

A fourteenth object of the present invention is to provide an information storage apparatus which can continuously record data without a discontinuity and with a stable quality without generating a recording error, even if a high temperature is reached during a data recording.

A fifteenth object of the present invention is to provide an information storage apparatus which can maintain a stable recording quality regardless of a temperature at a start of a data recording.

A sixteenth object of the present invention is to provide an information storage apparatus which can stably record data even if a temperature rise is caused by a rotational speed of a recording medium.

A seventeenth object of the present invention is to provide an information storage apparatus which can stably record data without deteriorating a recording quality and without generating a recording error, without a need to greatly slow down a recording rate even if a high temperature is detected.

A more specific object of the present invention is to provide an information storage apparatus for recording, reproducing and/or erasing information with respect to a recording medium, comprising servo error generation detecting means for detecting a generation of a servo error based on at least one of servo signals including a focus error signal and a tracking error signal which are derived from output signals of a light receiving element; and data recording resuming means for temporarily interrupting a data recording with respect to the recording medium, temporarily turning OFF a servo and then turning ON the servo again, to thereafter synchronize recording data to recorded data already recorded on the recording medium, and resume recording of the recording data continuing without a discontinuity to an end of the recorded data recorded immediately before the interruption of the data recording, when the servo error generation detecting means detects the generation of the servo error while recording data on the recording medium. According to the information storage apparatus of the present invention, it is possible to achieve the first object of the present invention.

A further object of the present invention is to provide an information storage apparatus for recording, reproducing and/or erasing information with respect to a recording medium, comprising servo error generation detecting means for detecting a generation of a servo error based on at least one of servo signals including a focus error signal and a tracking error signal which are derived from output signals of a light receiving element; and data recording resuming means for temporarily interrupting a data recording with respect to the recording medium, temporarily turning OFF only a tracking servo without turning OFF all servos and then turning ON the tracking servo again, to thereafter synchronize recording data to recorded data already recorded on the recording medium, and resume recording of the recording data continuing without a discontinuity to an end of the recorded data recorded immediately before the interruption of the data recording, when the servo error generation detecting means detects the generation of the servo error while recording data on the recording medium. According to the information storage apparatus of the present invention, it is possible to achieve the second object of the present invention.

In the information storage apparatus, the servo error generation detecting means may include means for detecting the generation of the servo error when a servo signal makes a transition from a signal level in a stable state of the servo signal to a state where the signal level is deviated by a predetermined threshold value. According to the information storage apparatus of the present invention, it is possible to achieve the third object of the present invention.

The information storage apparatus may further comprise rate changing means for changing a recording rate so as not to generate the servo error when resuming the recording by the data recording resuming means. According to the information storage apparatus of the present invention, it is possible to achieve the fourth object of the present invention.

The information storage apparatus may further comprise control means for resuming the recording of the recording data at a recording rate identical to a recording rate immediately before the recording is interrupted if a number of times the servo error is detected by the servo error generation detecting means is less than a predetermined number, and changing the recording rate so as not to generate the servo error if the number of times the servo error is detected is greater than or equal to the predetermined number, when resuming the recording by the data recording resuming means. According to the information storage apparatus of the present invention, it is possible to achieve the fifth object of the present invention.

Another object of the present invention is to provide an information storage apparatus for recording, reproducing and/or erasing information with respect to a recording medium, comprising ATIP signal detecting means for detecting an ATIP signal based on output signals from a light receiving element; ATIP decoding and ATIP error detecting means for decoding the ATIP signal detected by the ATIP signal detecting means to reproduce information included in the ATIP signal and to detect an ATIP error; ATIP error measuring means for measuring the ATIP error detected by the ATIP decoding and ATIP error detecting means to output an ATIP error rate; and data recording resuming means for temporarily interrupting a data recording with respect to the recording medium, to synchronize recording data to recorded data already recorded on the recording medium, and resume recording of the recording data continuing without a discontinuity to an end of the recorded data recorded immediately before the interruption of the data recording, when the ATIP error measuring means detects an increase of the ATIP error rate while recording data on the recording medium. According to the information storage apparatus of the present invention, it is possible to achieve the sixth object of the present invention.

Still another object of the present invention is to provide an information storage apparatus for recording, reproducing and/or erasing information with respect to a recording medium, comprising ATIP signal detecting means for detecting an ATIP signal based on output signals from a light receiving element; ATIP decoding and ATIP error detecting means for decoding the ATIP signal detected by the ATIP signal detecting means to reproduce information included in the ATIP signal and to detect an ATIP error; ATIP error measuring means for measuring the ATIP error detected by the ATIP decoding and ATIP error detecting means to output an ATIP error rate; and data recording resuming means for temporarily interrupting a data recording with respect to the recording medium, and changing a lens position related to the data recording by carrying out a carriage moving operation, to thereafter synchronize recording data to recorded data already recorded on the recording medium, and resume recording of the recording data continuing without a discontinuity to an end of the recorded data recorded immediately before the interruption of the data recording, when the ATIP error measuring means detects an increase of the ATIP error rate while recording data on the recording medium. According to the information storage apparatus of the present invention, it is possible to achieve the seventh object of the present invention.

The information storage apparatus may further comprise rate changing means for changing a recording rate so as not to increase the ATIP error rate when resuming the recording by the data recording resuming means. According to the information storage apparatus of the present invention, it is possible to achieve the eighth object of the present invention.

The information storage apparatus may further comprise control means for resuming the recording of the recording data at a recording rate identical to a recording rate immediately before the recording is interrupted if the ATIP error rate output from the ATIP error measuring means increases and a number of times the increase of the ATIP error rate is detected by the servo error generation detecting means is less than a predetermined number, and changing the recording rate so as not to increase the ATIP error rate if the number of times the increase of the ATIP error rate is detected is greater than or equal to the predetermined number, when resuming the recording by the data recording resuming means. According to the information storage apparatus of the present invention, it is possible to achieve the ninth object of the present invention.

A further object of the present invention is to provide an information storage apparatus for recording, reproducing and/or erasing information with respect to a recording medium, comprising shock and vibration detecting means for detecting shock, vibration or the like applied with respect to the information storage apparatus; and data recording resuming means for temporarily interrupting a data recording with respect to the recording medium when the shock and vibration detecting means detects the shock, vibration or the like while recording data on the recording medium, and for synchronizing recording data to recorded data already recorded on the recording medium, and resuming recording of the recording data continuing without a discontinuity to an end of the recorded data recorded immediately before the interruption of the data recording when the shock and vibration detecting means no longer detects the shock, vibration or the like. According to the information storage apparatus of the present invention, it is possible to achieve the tenth object of the present invention.

The information storage apparatus may further comprise rate changing means for changing a recording rate so as not to generate the shock, vibration or the like when resuming the recording by the data recording resuming means. According to the information storage apparatus of the present invention, it is possible to achieve the eleventh object of the present invention.

The information storage apparatus may further comprise control means for resuming the recording of the recording data at a recording rate identical to a recording rate immediately before the recording is interrupted if the number of times the shock, vibration or the like is detected by the shock and vibration detecting means is less than a predetermined number, and for changing the recording rate so as not to generate the shock, vibration or the like if the number of times the shock, vibration or the like is detected is greater than or equal to the predetermined number, when resuming the recording by the data recording resuming means. According to the information storage apparatus of the present invention, it is possible to achieve the twelfth object of the present invention.

In the information storage apparatus, the shock and vibration detecting means may include means for detecting the shock, vibration or the like based on a tracking error signal.

In the information storage apparatus, the shock and vibration detecting means may include means for detecting the shock, vibration or the like based on a focus error signal.

In the information storage apparatus, the shock and vibration detecting means may include means for detecting the shock, vibration or the like based on a reflectivity detection signal. According to these information storage apparatuses of the present invention, it is possible to achieve the thirteenth object of the present invention.

Another object of the present invention is to provide an information storage apparatus for recording, reproducing and/or erasing information with respect to a recording medium, comprising temperature measuring means for measuring a temperature within the information storage apparatus; and data recording resuming means for temporarily interrupting a data recording with respect to the recording medium when the temperature measuring means measures a high temperature which is greater than or equal to a predetermined temperature while recording data on the recording medium, and synchronizing recording data to recorded data already recorded on the recording medium and resuming recording of the recording data continuing without a discontinuity to an end of the recorded data recorded immediately before the interruption of the data recording when the temperature measured by the temperature measuring means becomes less than the predetermined temperature. According to the information storage apparatus of the present invention, it is possible to achieve the fourteenth object of the present invention.

In the information storage apparatus, the data recording resuming means may include means for detecting a high temperature state when a difference between the temperature measured by the temperature measuring means during the data recording and an initial temperature measured before a start of the data recording exceeds a predetermined threshold value. According to the information storage apparatus of the present invention, it is possible to achieve the fifteenth object of the present invention.

The information storage apparatus may further comprise rate changing means for changing a recording rate so as not to generate a high temperature state when resuming the recording by the data recording resuming means. According to the information storage apparatus of the present invention, it is possible to achieve the sixteenth object of the present invention.

The information storage apparatus may further comprise control means for resuming the recording of the recording data at a recording rate identical to a recording rate immediately before the recording is interrupted if a number of times the high temperature state is detected is less than a predetermined number, and for reducing the recording rate in steps so as not to generate the high temperature state if the number of times the high temperature state is detected is greater than or equal to the predetermined number, when resuming the recording by the data recording resuming means. According to the information storage apparatus of the present invention, it is possible to achieve the seventeenth object of the present invention.

Other objects and further features of the present invention will be apparent from the following detailed description when read in conjunction with the accompanying drawings.

DESCRIPTION OF THE PREFERRED EMBODIMENTS

Figure 1:
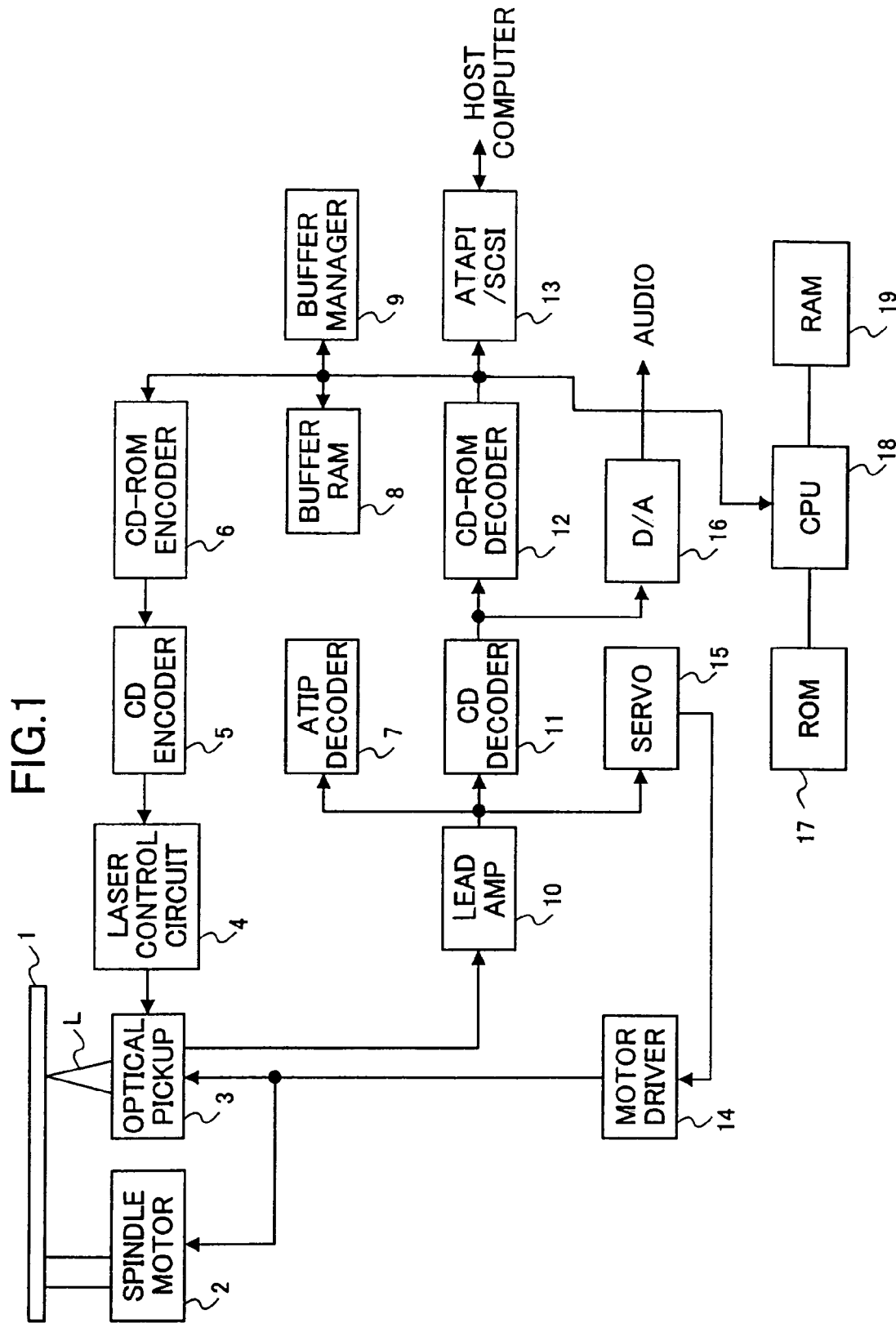
FIG. 1 is a system block diagram for explaining first through ninth embodiment of an information storage apparatus according to the present invention.

A description will be given of various embodiments of an information storage apparatus according to the present invention, by referring to the drawings.

(1) First Through Ninth Embodiments

FIG. 1 is a system block diagram for explaining first through ninth embodiments of the information storage apparatus according to the present invention. In the first through ninth embodiments, the present invention is applied to an optical disk unit.

The optical disk unit includes an optical disk 1 which may be detachably loaded, a spindle motor 2, an optical pickup 3, a laser control circuit 4, a CD encoder 5, a CD-ROM encoder 6, an ATIP decoder 7, a buffer RAM 8, a buffer manager 9, a lead amplifier 10, a CD decoder 11, a CD-ROM decoder 12, an ATAPI/SCSI interface 13, a motor driver 14, a servo circuit 15, a digital-to-analog (D/A) converter 16, a ROM 17, a CPU 18 and a RAM 19 which are connected as shown in FIG. 1.

In the optical disk unit, the optical disk 1 is rotated by the spindle motor 2. The spindle motor 2 is controlled by the motor driver 14 and the servo circuit 15, so that a linear velocity becomes constant. The linear velocity may be changed in steps by the motor driver 14 and the servo circuit 15.

The optical pickup 3 includes a semiconductor laser, an optical system, a focus actuator, a track actuator, a light receiving element and a position sensor which are known and not shown in FIG. 1. This optical pickup 3 irradiates a laser beam L on a recording surface of the optical disk 1.

In addition, the optical pickup is movable in a sledge direction by a seek motor which is not shown. The focus actuator, the track actuator and the seek motor are controlled by the motor driver 14 and the servo circuit 15 based on signals obtained from the light receiving element and the position sensor, so that a laser spot of the laser beam L is positioned at a target position, that is, a data recording position or a data reproducing position, on the optical disk 1.

When reproducing the data, a reproduced signal obtained from the optical pickup 3 is amplified and binarized by the lead amplifier 10, before being input to the CD decoder 11 which carries out a deinterleaving process and an error correction process. After being subjected to the deinterleaving and error correction processes, the data are input to the CD-ROM decoder 12 which carries out an error correction process to improve reliability of the data.

Thereafter, the data processed by the CD-ROM decoder 12 are temporarily stored in the buffer RAM 8 by the buffer manager 9, and when a sector data is obtained, the sector-data is transferred to a host computer (not shown) via the ATAPI/SCSI interface 13.

In a case where the data read from the optical disk 1 are music data, the data output from the CD decoder 11 are input to the D/A converter 16 to obtain an analog audio signal. This analog audio signal is output as an audio output.

Next, when recording data, data from the host computer are received by the ATAPI/SCSI interface 13, and the received data are temporarily stored in the buffer RAM 8 by the buffer manager 9.

The recording is started when a certain amount of data is stored in the buffer RAM 8, but before starting the recording, the laser spot is positioned to a write start position on the optical disk 1. The write start position is obtained from a wobble signal which is prerecorded in the form of a wave-shaped track on the optical disk 1. The wobble signal includes absolute time information called ATIP, and the ATIP information is obtained by the ATIP decoder 7.

In addition, a synchronizing signal generated from the ATIP decoder 7 is input to the CD encoder 5, so that the data can be written at an accurate position.

The data stored in the buffer RAM 8 are subjected to processes, such as adding an error correction code and interleaving, in the CD-ROM encoder 6 and the CD encoder 5, and is recorded on the optical disk 1 via the laser control circuit 4 and the optical pickup 3.

When a servo error is generated during the information recording of the optical disk unit, a recording error may be generated.

Particularly in the case of a data recording with respect to a write-once optical disk such as the CD-R, when the recording error is generated, the recorded optical disk cannot be reused and is thus wasted. In addition, the time used for the recording up to that point in time is also wasted.

Accordingly, when the CPU 18 detects a servo error from a servo detection signal from the servo circuit 15, the CPU 18 temporarily interrupts the data recording, and synchronizes the recording data which are to be newly recorded to the recorded data already recorded on the optical disk 1. Furthermore, the CPU 18 resumes the data recording of the recording data which continues to the recorded data recorded immediately before the interruption of the recording, from the recording start position.

Therefore, even if the servo error is generated during the data recording with respect to the optical disk 1, the recording error is prevented from being generated in the optical disk unit.

In other words, this optical disk unit forms an information storage apparatus which can record, reproduce and/or erase information with respect to a recording medium.

The servo circuit 15, the CPU 18 and the like function as a servo error generation detecting means for detecting the generation of the servo error based on a servo signal such as the focus error signal and the tracking error signal, by carrying out operations on the signals from the light receiving element.

Furthermore, the CPU 18 and the like function as a data recording resuming means. When the servo error generation detecting means described above detects the generation of the servo error while recording data on the recording medium, this data recording resuming means temporarily interrupts the data recording with respect to the recording medium, temporarily turns OFF the servo and then turns ON the servo again, to thereafter synchronize the recording data to the recorded data already recorded on the recording medium, and resume recording of the recording data continuing without a discontinuity to an end of the recorded data recorded immediately before the interruption of the data recording.

In addition, the CPU 18 and the like function as a data recording resuming means. When the servo error generation detecting means described above detects the generation of the servo error while recording data on the recording medium, this data recording resuming means temporarily interrupts the data recording with respect to the recording medium, temporarily turns OFF only the tracking servo without turning OFF all of the servos and then turns ON the tracking servo again, to thereafter synchronize the recording data to the recorded data already recorded on the recording medium, and resume recording of the recording data continuing without a discontinuity to an end of the recorded data recorded immediately before the interruption of the data recording.

The servo circuit 15, the CPU 18 and the like also function as a means for detecting the generation of the servo error when the servo signal makes a transition from a signal level in a stable state of the servo signal to a state where the signal level is deviated by a predetermined threshold value.

Moreover, the motor driver 14, the servo circuit 15, the CPU 18 and the like function as a rate changing means for changing the recording rate so as not to generate the servo error when resuming the recording by the data recording resuming means described above.

The motor driver 14, the servo circuit 15, the CPU 18 and the like also function as a control means. If a number of times the servo error is detected by the servo error generation detecting means described above is less than a predetermined number when resuming the recording by the data recording resuming means described above, the control means resumes the recording of the recording data at a recording rate identical to the recording rate immediately before the recording is interrupted. On the other hand, if the number of times the servo error is detected is greater than or equal to the predetermined number, the control means changes the recording rate so as not to generate the servo error.

(1-1) Data Recording Process of First Embodiment

Figure 2:
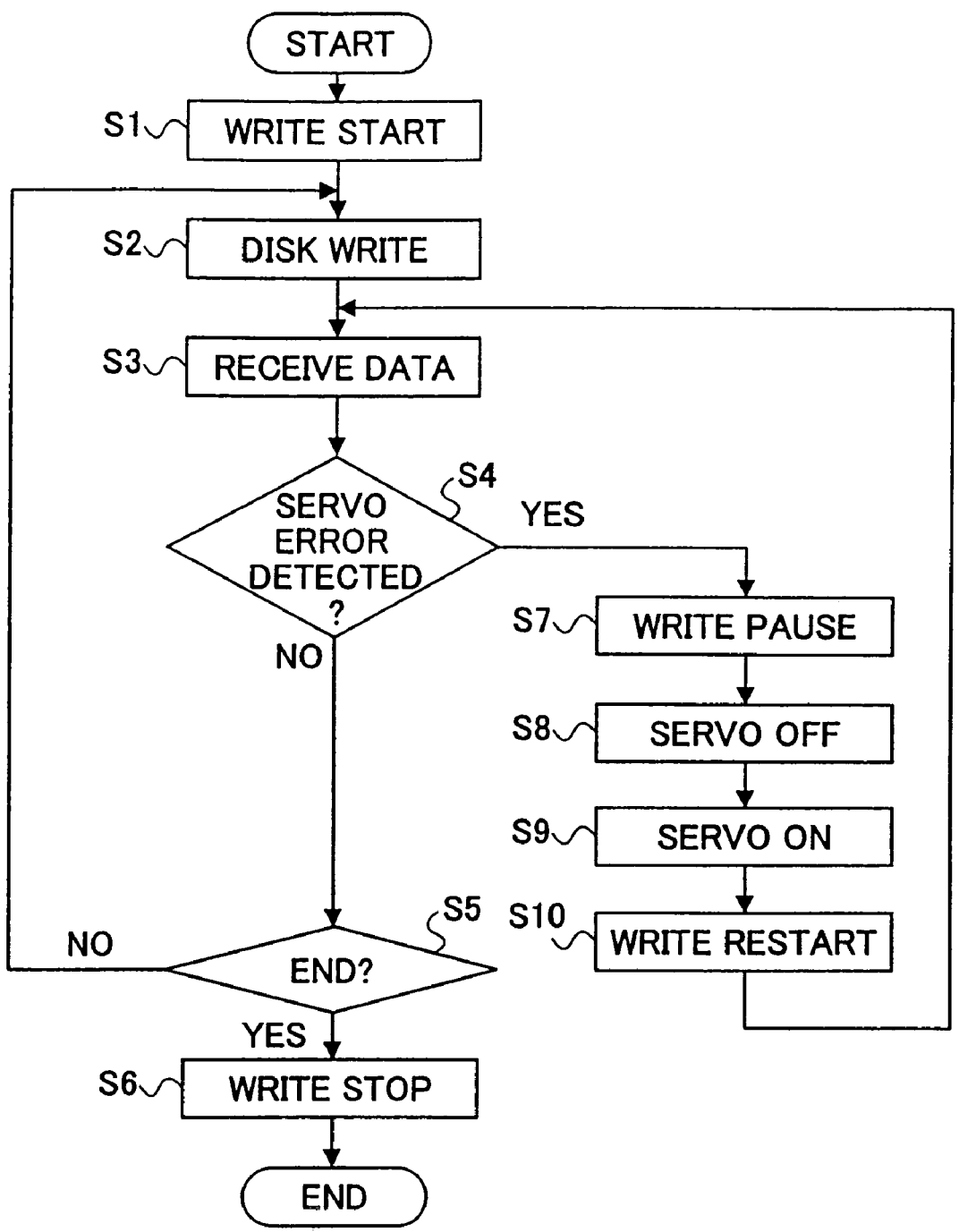
FIG. 2 is a flow chart for explaining an operation of the first embodiment of the information storage apparatus.

FIG. 2 is a flow chart for explaining a data recording process of the first embodiment of the optical disk unit shown in FIG. 1. FIG. 2 shows the interruption and resuming of the recording when the servo error is generated during the data recording in the optical disk unit shown in FIG. 1.

The data recording process starts from a step S1 which carries out a write start operation. A step S2 carries out a disk write operation to start the data recording. A step S3 receives the data from the host computer, and a step S4 decides whether or not a servo error is detected.

If the decision result in the step S4 is NO, a step S5 decides whether or not a data write operation is ended. If the decision result in the step S5 is NO, the process returns to the step S2 to continue the data write operation. On the other hand, if the decision result in the step S5 is YES, a step S6 carries out a write stop operation to end the data recording, and the process ends.

In addition, if the decision result in the step S4 is YES, a step S7 carries out a write pause operation to temporarily interrupt the data write with respect to the optical disk 1. A step S8 temporarily turns OFF the servos, and a step S9 turns ON the servos again. Then, a step S10 carries out a write restart operation to resume the data write operation with respect to the optical disk 1 in synchronism with the recorded data already recorded on the optical disk 1. The process returns to the step S3 after the step S10, so as to continue the data write operation. Hence, the recording data continuing to the end of the recorded data recorded immediately before the recording was interrupted is recorded so that there is no discontinuity with the recorded data recorded immediately before the recording was interrupted.

Therefore, even if the servo error is generated during the data recording, it is possible to continuously record the recording data without a discontinuity, and without generating a recording error.

(1-2) Data Recording Process of Second Embodiment

Figure 3:
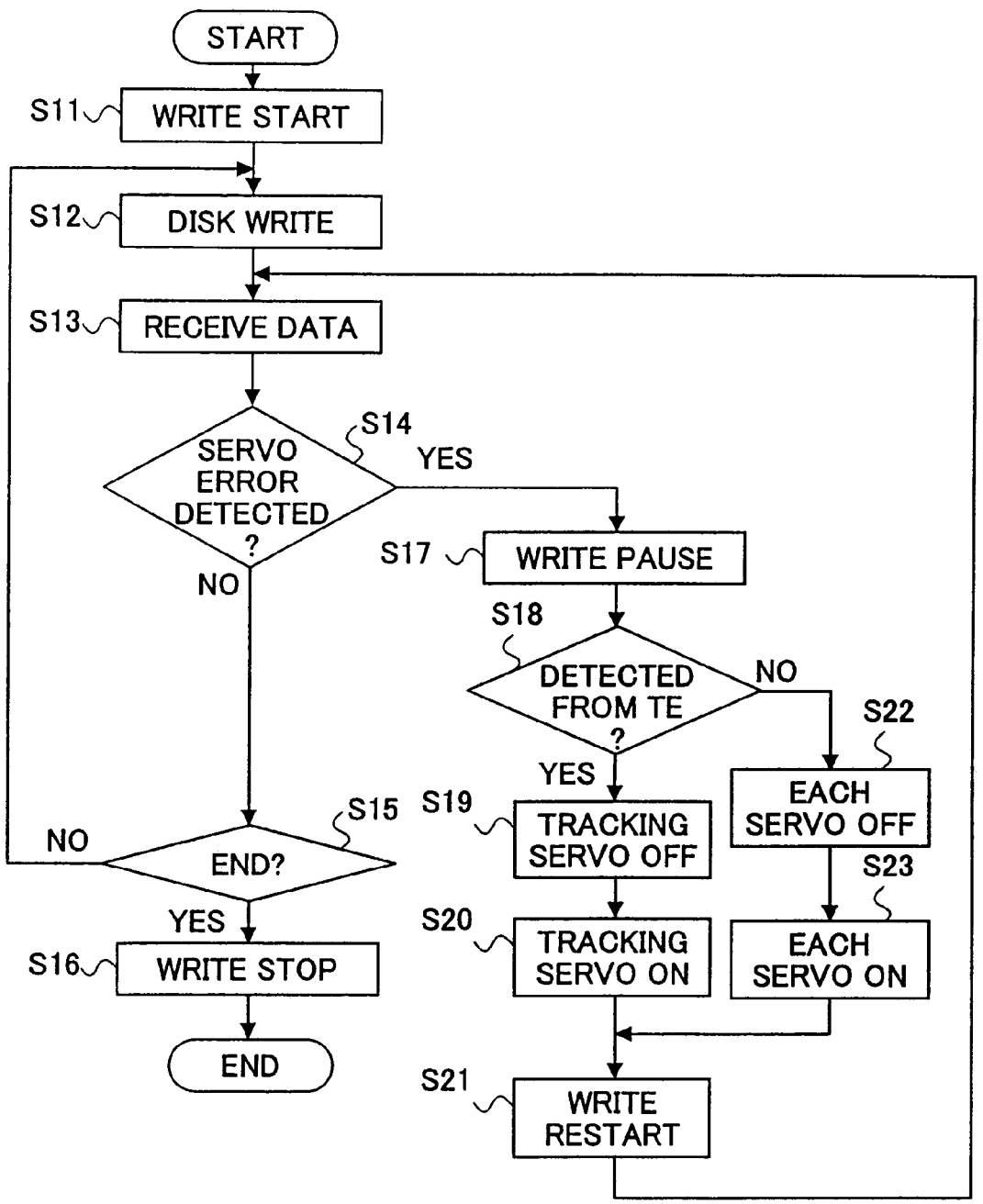
FIG. 3 is a flow chart for explaining an operation of the second embodiment of the information storage apparatus.

FIG. 3 is a flow chart for explaining a data recording process of the second embodiment of the optical disk unit shown in FIG. 1.

The data recording process starts from a step S11 which carries out a write start operation. A step S12 carries out a disk write operation to start the data recording. A step S13 receives the data from the host computer, and a step S14 decides whether or not a servo error is detected.

If the decision result in the step S14 is NO, a step S15 decides whether or not a data write operation is ended. If the decision result in the step S15 is NO, the process returns to the step S12 to continue the data write operation. On the other hand, if the decision result in the step S15 is YES, a step S16 carries out a write stop operation to end the data recording, and the process ends.

In addition, if the decision result in the step S14 is YES, a step S17 carries out a write pause operation to temporarily interrupt the data write with respect to the optical disk 1. A step S18 decides whether or not the detected servo error is caused by the tracking error signal (TE).

If the decision result in the step S18 is YES, a step S19 temporarily turns OFF only the tracking servo without turning OFF all of the servos, and a step S20 turns ON the tracking servo again. Then, a step S21 carries out a write restart operation to resume the data write operation with respect to the optical disk 1 in synchronism with the recorded data already recorded on the optical disk 1. The process returns to the step S13 after the step S21, so as to continue the data write operation. Hence, the recording data continuing to the end of the recorded data recorded immediately before the recording was interrupted is recorded so that there is no discontinuity with the recorded data recorded immediately before the recording was interrupted.

On the other hand, if the decision result in the step S18 is NO, a step S22 turns OFF all of the servos including the tracking servo, and a step S23 turns ON all of the servos again. Then, the process advances to the step S21 which carries out a write restart operation to resume the data write operation with respect to the optical disk 1 in synchronism with the recorded data already recorded on the optical disk 1. The process returns to the step S13 after the step S21, so as to continue the data write operation. Hence, the recording data continuing to the end of the recorded data recorded immediately before the recording was interrupted is recorded so that there is no discontinuity with the recorded data recorded immediately before the recording was interrupted.

Hence, when the cause of the servo error is the tracking servo error, the focus servo of the focus system may be in an on-servo state. For this reason, only the tracking servo is turned OFF and then turned ON, so that the on-servo state is restored at a high speed, and so that the data can be stably recorded continuously without a discontinuity.

Therefore, in the case of the servo error detected from the tracking error signal during the data recording, the focus servo of the focus system which is carrying out a stable servo is not turned OFF and ON. Consequently, the stable on-servo state can be obtained at a high speed, and the data can be stably recorded continuously without a discontinuity. In other words, it is possible to restore the on-servo state from the servo error without taking an unnecessarily long time for the restoration.

(1-3) Data Recording Process of Third Embodiment

A data recording process of the third embodiment is basically the same as the data recording process shown in FIG. 2 or 3, except for the detection of the servo error.

a certain amount, before the servo error is actually generated during the data recording, and resuming the data recording after carrying out a servo retry, it is possible to prevent the data recording in the off-servo state, and positively record the data with a stable quality.

(1-4) Data Recording Process of Fourth Embodiment

Figure 4:
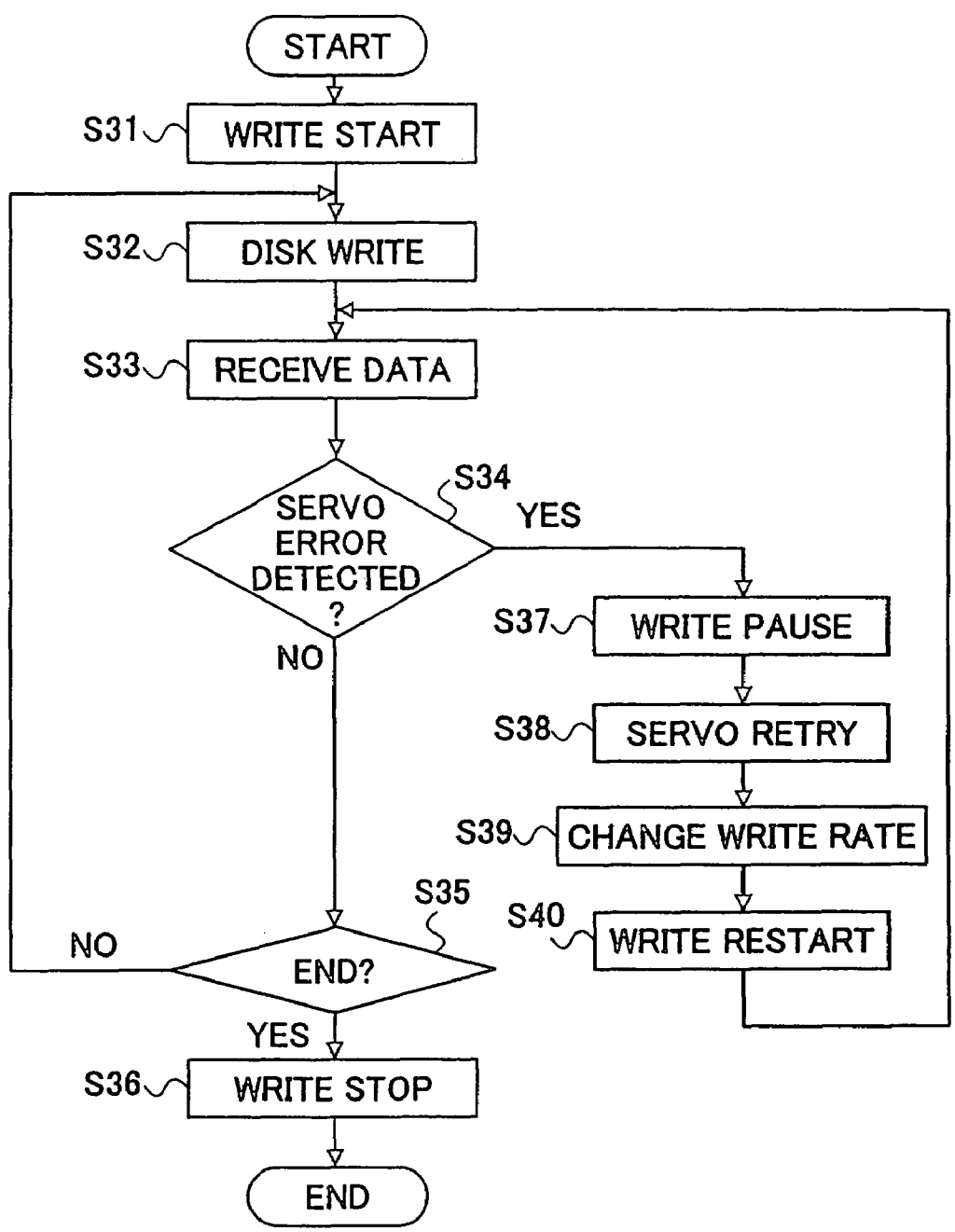
FIG. 4 is a flow chart for explaining an operation of the fourth embodiment of the information storage apparatus.

FIG. 4 is a flow chart for explaining a data recording process of the fourth embodiment of the optical disk unit shown in FIG. 1.

The data recording process starts from a step S31 which carries out a write start operation. A step S32 carries out a disk write operation to start the data recording. A step S33 receives the data from the host computer, and a step S34 decides whether or not a servo error is detected.

If the decision result in the step S34 is NO, a step S35 decides whether or not a data write operation is ended. If the decision result in the step S35 is NO, the process returns to the step S32 to continue the data write operation. On the other hand, if the decision result in the step S35 is YES, a step S36 carries out a write stop operation to end the data recording, and the process ends.

In addition, if the decision result in the step S34 is YES, a step S37 carries out a write pause operation to temporarily interrupt the data write with respect to the optical disk 1. A step S38 carries out a servo retry operation.

The servo retry operation of the step S38 corresponds to a process of turning OFF and turning ON the servo in the steps S8 and S9 shown in FIG. 2 or, in the steps S18 through S20, S22 and S23 shown in FIG. 3.

After the servo retry operation of the step S38, a step S39 changes a write rate to a write data (recording rate) which will not cause the servo error. Then, a step S40 carries out a write restart operation to resume the data write operation with respect to the optical disk 1 in synchronism with the recorded data already recorded on the optical disk 1. The process returns to the step S33 after the step S40, so as to continue the data write operation. Hence, the recording data continuing to the end of the recorded data recorded immediately before the recording was interrupted is recorded so that there is no discontinuity with the recorded data recorded immediately before the recording was interrupted.

For example, the write rate can be changed by changing the rotational speed of the optical disk 1 by controlling the spindle motor 2.

When the cause of the generated servo error is dependent on the rotational speed of the optical disk 1 on which the data are to be recorded, it is possible to avoid the generation of the servo error by changing the rotational speed of the optical disk 1. Hence, a stable data recording can be carried out without entering a loop which is a repetition of the write stop and the write restart.

Therefore, even if the cause of the servo error generated during the data recording is dependent on the rotational speed of the optical disk 1, it is possible to stably carry out the data recording without repeating the interruption and resuming of the data recording, and to avoid the servo error which is dependent on the rotational speed of the optical disk 1 on which the data are to be recorded.

(1-5) Data Recording Process of Fifth Embodiment

Figure 5:
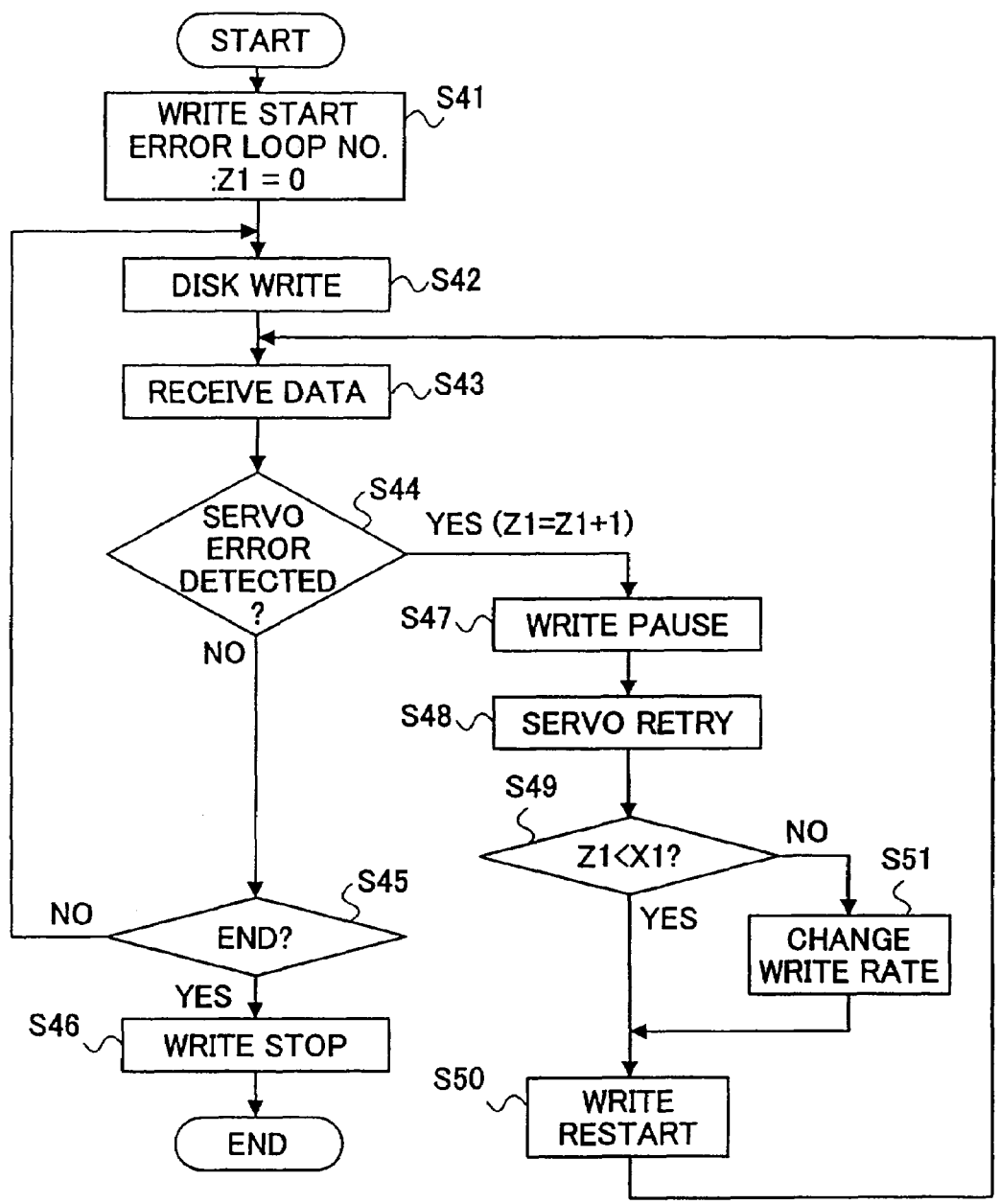
FIG. 5 is a flow chart for explaining an operation of the fifth embodiment of the information storage apparatus.

FIG. 5 is a flow chart for explaining a data recording process of the fifth embodiment of the optical disk unit shown in FIG. 1.

The data recording process starts from a step S41 which carries out a write start operation and initially sets an error loop number Z1 to Z1=0. A step S42 carries out a disk write operation to start the data recording. A step S43 receives the data from the host computer, and a step S44 decides whether or not a servo error is detected.

If the decision result in the step S44 is NO, a step S45 decides whether or not a data write operation is ended. If the decision result in the step S45 is NO, the process returns to the step S42 to continue the data write operation. On the other hand, if the decision result in the step S45 is YES, a step S46 carries out a write stop operation to end the data recording, and the process ends.

In addition, if the decision result in the step S44 is YES, the error loop number Z1 is incremented to Z1=Z1+1, and a step S47 carries out a write pause operation to temporarily interrupt the data write with respect to the optical disk 1. A step S48 temporarily turns OFF the servos, and a step S49 decides whether or not the error loop number Z1 is smaller than a predetermined number X1 which is preset, that is, whether or not Z1<X1. If the decision result in the step S49 is YES, a step S50 carries out a write restart operation to resume the data write operation with respect to the optical disk 1 in synchronism with the recorded data already recorded on the optical disk 1, without changing the write rate. The process returns to the step S43 after the step S50, so as to continue the data write operation. Hence, the recording data continuing to the end of the recorded data recorded immediately before the recording was interrupted is recorded so that there is no discontinuity with the recorded data recorded immediately before the recording was interrupted.

On the other hand, if the decision result in the step S49 is NO, a step S51 changes the write rate to a write rate (recording rate) which will not generate the servo error. After the step S51, the process advances to the step S50 which carries out a write restart operation to resume the data write operation with respect to the optical disk 1 in synchronism with the recorded data already recorded on the optical disk 1, with the changed write rate. The process returns to the step S43 after the step S50, so as to continue the data write operation. Hence, the recording data continuing to the end of the recorded data recorded immediately before the recording was interrupted is recorded so that there is no discontinuity with the recorded data recorded immediately before the recording was interrupted.

Therefore, until the servo error is detected the predetermined number of times, the write operation is carried out at the initially set write rate, and the write rate will not be changed unnecessarily every time the servo error is detected, to thereby prevent the write time from becoming unnecessarily long.

Furthermore, when the servo error is detected consecutively, it is possible to carry out a stable write operation by changing the write rate.

Accordingly, when the servo error is detected the predetermined number of times or greater during the data recording, it is possible to carry out the data recording stably at a high speed as much as possible, without greatly decreasing the recording rate when changing the recording rate.

(2) Sixth Through Ninth Embodiments

The optical disk unit of sixth through ninth embodiments has a structure which is basically the same as that of the optical disk unit shown in FIG. 1, except for the functions of the ATIP decoder 7, the CPU 18 and the like.

When recording the data in the optical disk unit of the sixth through ninth embodiments, the data transferred from the host computer and received by the ATAPI/SCSI interface 13 are temporarily stored in the buffer RAM 8 by the buffer manager 9.

The recording is started when a certain amount of data is stored in the buffer RAM 8, but before starting the recording, the laser spot is positioned to a write start position on the optical disk 1. The write start position is obtained from a wobble signal which is prerecorded in the form of a wave-shaped track on the optical disk 1.

The wobble signal includes absolute time information called ATIP, and the ATIP information is obtained by the ATIP decoder 7. The ATIP decoder 7 also detects an ATIP error, and measures an ATIP error rate.

A synchronizing signal generated from the ATIP decoder 7 is input to the CD encoder 5, so that the data can be written at an accurate position.

The data stored in the buffer RAM 8 are subjected to processes, such as adding an error correction code and interleaving, in the CD-ROM encoder 6 and the CD encoder 5, and is recorded on the optical disk 1 via the laser control circuit 4 and the optical pickup 3.

When the ATIP error rate increases during the data recording in the optical disk unit, a recording error may be generated due to a deviation from a synchronized state.

Particularly in the case of a data recording with respect to a write-once optical disk such as the CD-R, when the recording error is generated, the recorded optical disk cannot be reused and is thus wasted.

Accordingly, when the CPU 18 detects an increase of the ATIP error rate from the ATIP decoder 7, the CPU 18 temporarily interrupts the data recording, and synchronizes the recording data which are to be newly recorded to the recorded data already recorded on the optical disk 1. Furthermore, the CPU 18 resumes the data recording of the recording data which continues to the recorded data recorded immediately before the interruption of the recording, from the recording start position.

Therefore, the recording error caused by the increase of the ATIP error rate is prevented from being generated in the optical disk unit.

In other words, this optical disk unit forms an information storage apparatus which can record, reproduce and/or erase information with respect to a recording medium.

The ATIP decoder 7 and the like function as an ATIP signal detecting means for detecting an ATIP signal by carrying out an operation on the signals from the light receiving element, an ATIP decoding and ATIP error detecting means for decoding the ATIP signal detected by the ATIP signal detecting means to reproduce information included in the ATIP signal and to detect an ATIP error, and an ATIP error measuring means for measuring the ATIP error detected by the ATIP decoding and ATIP error detecting means to output an ATIP error rate.

Furthermore, the CPU 18 and the like function as a data recording resuming means. When the ATIP error measuring means described above detects the increase of the ATIP error rate while recording data on the recording medium, this data recording resuming means temporarily interrupts the data recording with respect to the recording medium, to synchronize the recording data to the recorded data already recorded on the recording medium, and resume recording of the recording data continuing without a discontinuity to an end of the recorded data recorded immediately before the interruption of the data recording.

In addition, the CPU 18 and the like function as a data recording resuming means. When the ATIP error measuring means described above detects the increase of the ATIP error rate while recording data on the recording medium, this data recording resuming means temporarily interrupts the data recording with respect to the recording medium, changes a lens position related to the data recording by carrying out a carriage moving operation, to thereafter synchronize the recording data to the recorded data already recorded on the recording medium, and resume recording of the recording data continuing without a discontinuity to an end of the recorded data recorded immediately before the interruption of the data recording.

Moreover, the motor driver 14, the servo circuit 15, the CPU 18 and the like function as a rate changing means for changing the recording rate so as not to increase the ATIP error rate when resuming the recording by the data recording resuming means described above.

The motor driver 14, the servo circuit 15, the CPU 18 and the like also function as a control means. If the ATIP error rate output from the ATIP error measuring means increases and a number of times the increase of the ATIP error rate is detected by the servo error generation detecting means described above is less than a predetermined number when resuming the recording by the data recording resuming means described above, the control means resumes the recording of the recording data at a recording rate identical to the recording rate immediately before the recording is interrupted. On the other hand, if the number of times the increase of the ATIP error rate is detected is greater than or equal to the predetermined number, the control means changes the recording rate so as not to increase the ATIP error rate.

(2-1) Data Recording Process of Sixth Embodiment

Figure 6:
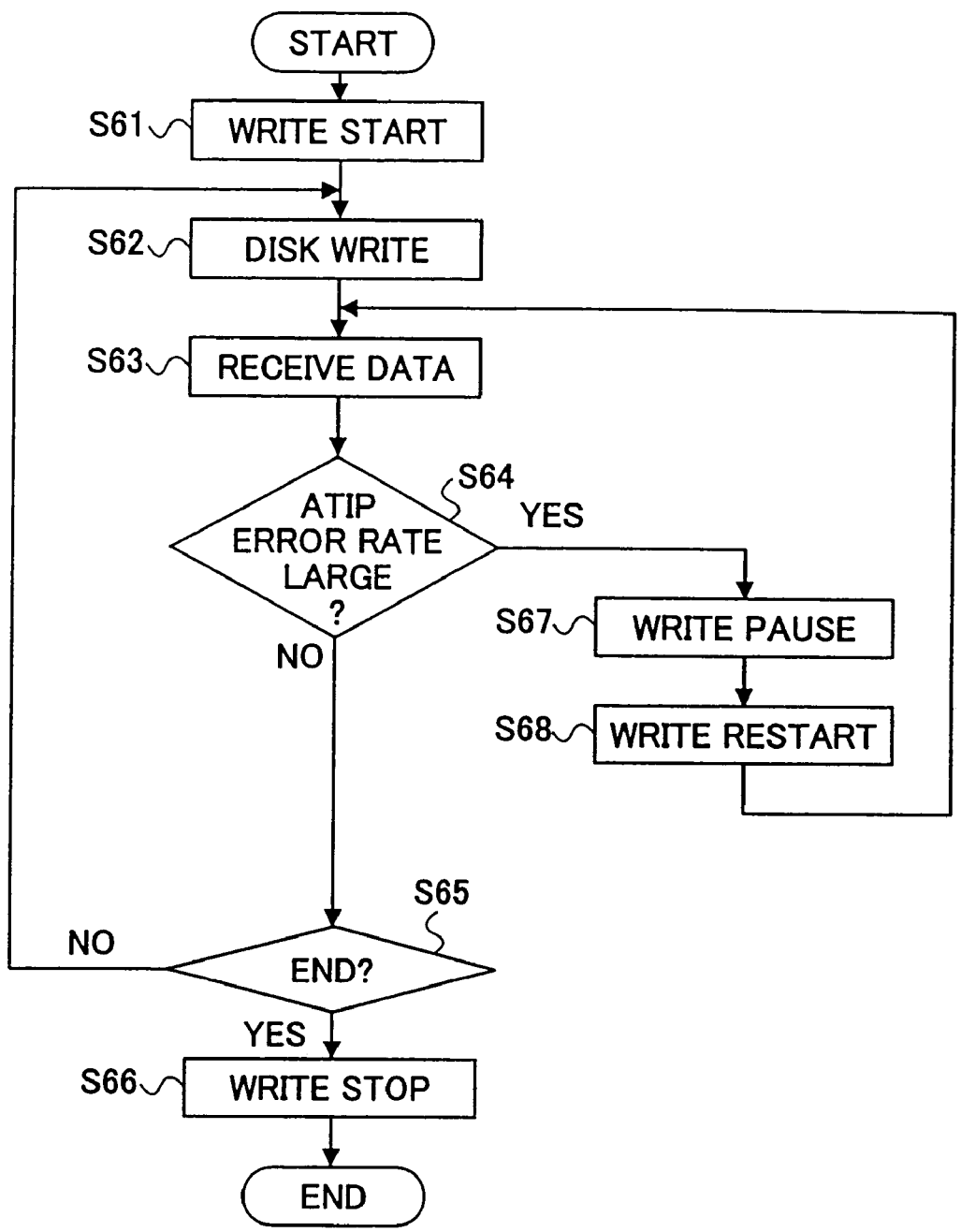
FIG. 6 is a flow chart for explaining an operation of the sixth embodiment of the information storage apparatus.

FIG. 6 is a flow chart for explaining a data recording process of the sixth embodiment of the optical disk unit shown in FIG. 1. FIG. 6 shows the interruption and resuming of the recording when the increase of the ATIP error is detected during the data recording in the optical disk unit shown in FIG. 1.

The data recording process starts from a step S61 which carries out a write start operation. A step S62 carries out a disk write operation to start the data recording. A step S63 receives the data from the host computer, so as to detect the ATIP signal, decode the ATIP signal to reproduce the information included in the ATIP signal and to detect the ATIP error, and to measure the ATIP error rate. A step S64 decides whether or not the ATIP error rate has increased and is large.

If the decision result in the step S64 is NO, a step S65 decides whether or not a data write operation is ended. If the decision result in the step S65 is NO, the process returns to the step S62 to continue the data write operation. On the other hand, if the decision result in the step S65 is YES, a step S66 carries out a write stop operation to end the data recording, and the process ends.

In addition, if the decision result in the step S64 is YES, a step S67 carries out a write pause operation to temporarily interrupt the data write with respect to the optical disk 1. A step S68 carries out a write restart operation to resume the data write operation with respect to the optical disk 1 in synchronism with the recorded data already recorded on the optical disk 1. The process returns to the step S63 after the step S68, so as to continue the data write operation. Hence, the recording data continuing to the end of the recorded data recorded immediately before the recording was interrupted is recorded so that there is no discontinuity with the recorded data recorded immediately before the recording was interrupted.

Therefore, even if the ATIP error rate increases during the data recording, it is possible to continuously record the recording data without a discontinuity, and without generating a recording error.

(2-2) Data Recording Process of Seventh Embodiment

Figure 7:
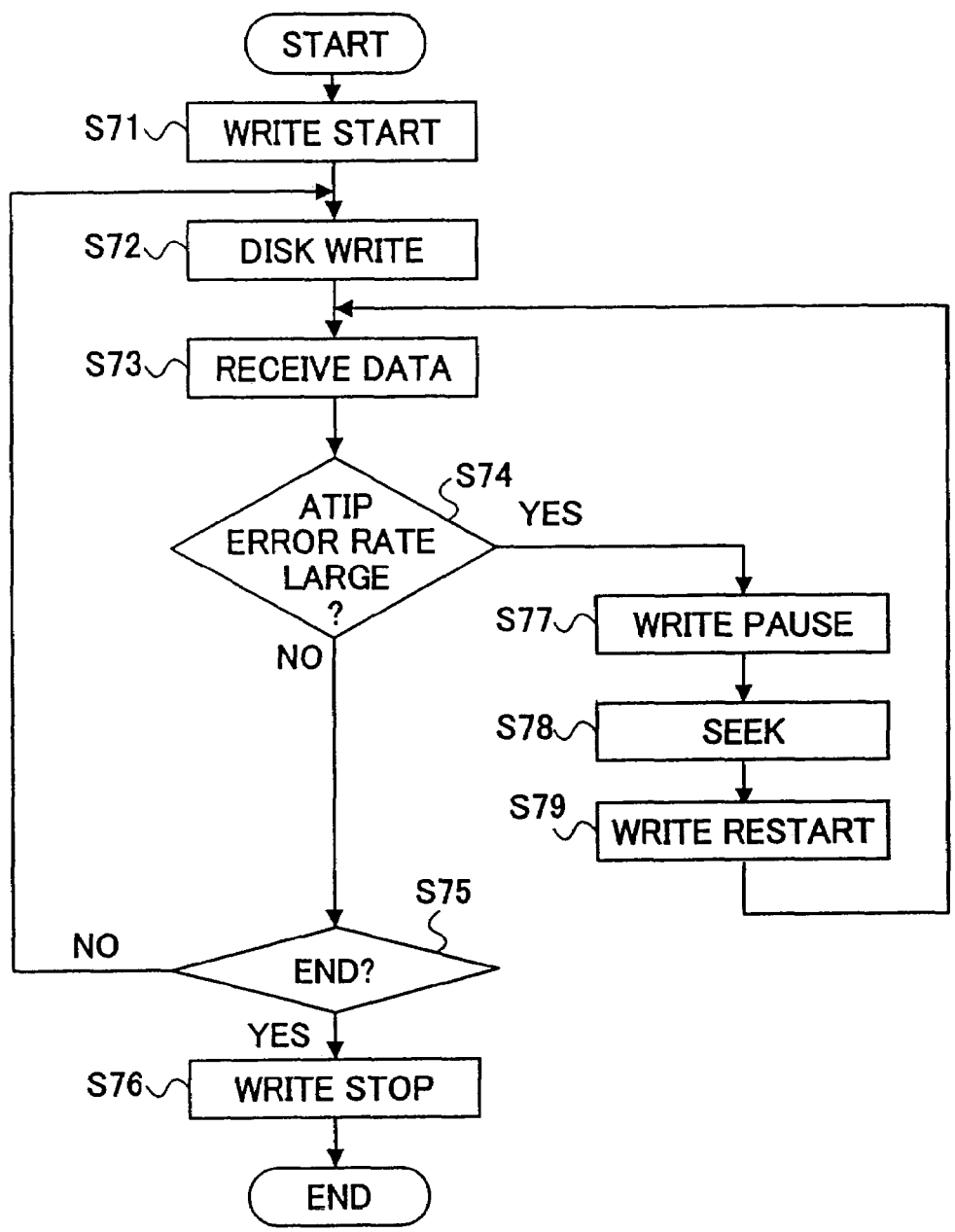
FIG. 7 is a flow chart for explaining an operation of the seventh embodiment of the information storage apparatus.

FIG. 7 is a flow chart for explaining a data recording process of the seventh embodiment of the optical disk unit shown in FIG. 1.

The data recording process starts from a step S71 which carries out a write start operation. A step S72 carries out a disk write operation to start the data recording. A step S73 receives the data from the host computer, so as to detect the ATIP signal, decode the ATIP signal to reproduce the information included in the ATIP signal and to detect the ATIP error, and to measure the ATIP error rate. A step S74 decides whether or not the ATIP error rate has increased and is large.

If the decision result in the step S74 is NO, a step S75 decides whether or not a data write operation is ended. If the decision result in the step S75 is NO, the process returns to the step S72 to continue the data write operation. On the other hand, if the decision result in the step S75 is YES, a step S76 carries out a write stop operation to end the data recording, and the process ends.

In addition, if the decision result in the step S74 is YES, a step S77 carries out a write pause operation to temporarily interrupt the data write with respect to the optical disk 1. A step S78 temporarily carries out a seek operation, to move the carriage by a carriage moving operation of the optical disk unit so as to change the lens position. Then, a step S79 carries out a write restart operation to resume the data write operation with respect to the optical disk 1 in synchronism with the recorded data already recorded on the optical disk 1. The process returns to the step S73 after the step S79, so as to continue the data write operation. Hence, the recording data continuing to the end of the recorded data recorded immediately before the recording was interrupted is recorded so that there is no discontinuity with the recorded data recorded immediately before the recording was interrupted.

When the increase of the ATIP error rate is caused by the relative position (hereinafter referred to as a lens position) of the objective lens of the optical pickup with respect to the carriage which moves the objective lens, the actuator and the like in a radial direction of the optical disk 1, the lens position remains virtually under the same condition if the carriage does not move, even when the write pause operation is temporarily carried out before carrying out the write restart operation as described above in conjunction with the flow chart shown in FIG. 6. In this case, the ATIP error rate increases again, to cause the process to enter a loop of the write pause and restart operations.

On the other hand, in the flow chart shown in FIG. 7, if the increase of the ATIP error rate is detected and the ATIP error rate is large in the step S74, the step S77 carries out the write pause operation which is followed by the temporary seek operation of the step S78. By this seek operation, the lens position is changed by moving the carriage from the position where the ATIP error rate was large, before the step S79 carries out the write restart operation. As a result, the write restart operation is prevented from being started from the lens position where the ATIP error rate is large, and the number of times the process enters the loop of the write pause and restart operations is reduced. Consequently, it is possible to stably carry out the data recording (write).

Therefore, it is possible to avoid an increase of the ATIP error rate caused by the lens position during the data recording, and it is possible to carry out a stable data recording and to avoid the increase of the ATIP error rate caused by the lens position.

(2-3) Data Recording Process of Eighth Embodiment

Figure 8:
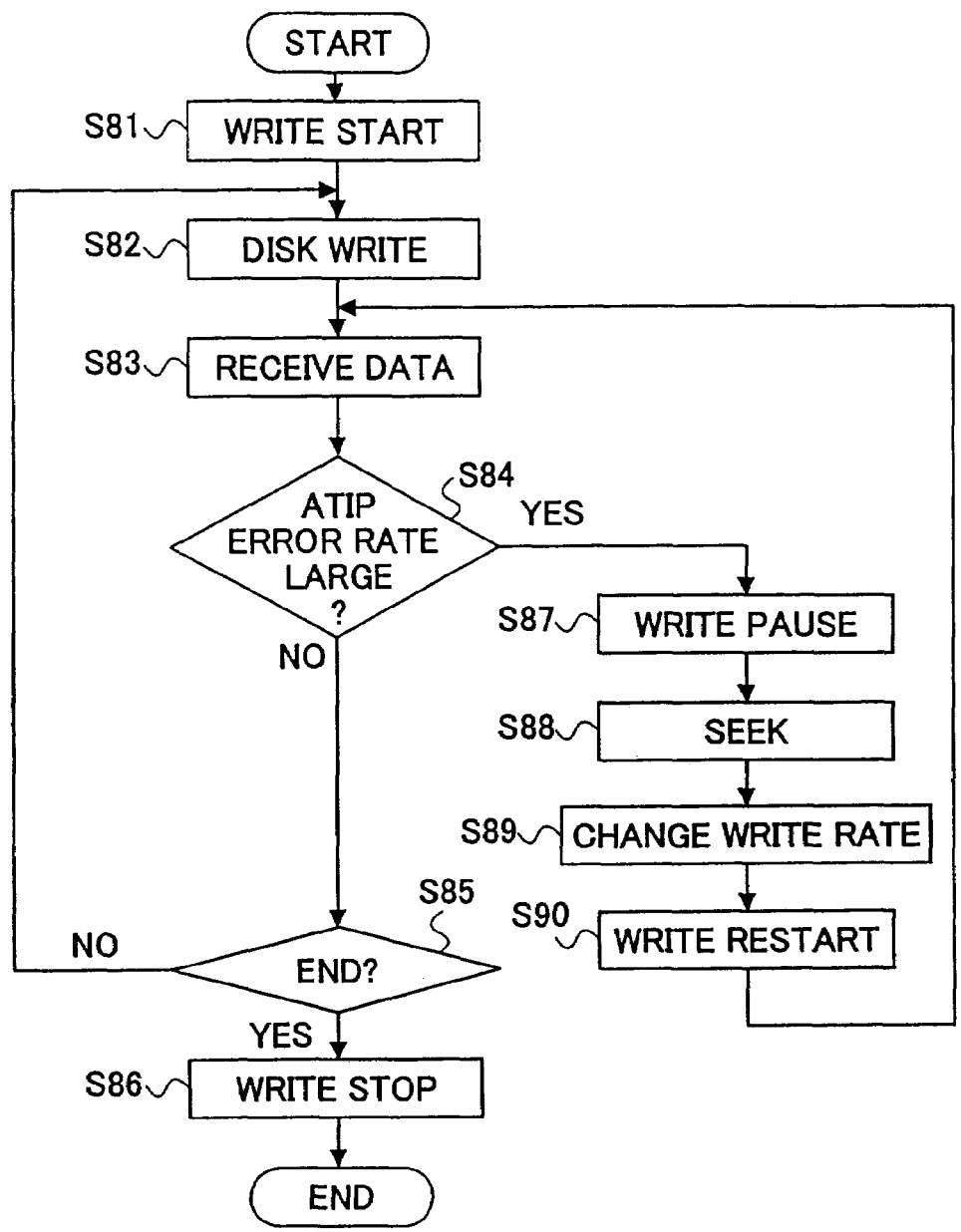
FIG. 8 is a flow chart for explaining an operation of the eighth embodiment of the information storage apparatus.

FIG. 8 is a flow chart for explaining a data recording process of the eighth embodiment of the optical disk unit shown in FIG. 1.

The data recording process starts from a step S81 which carries out a write start operation. A step S82 carries out a disk write operation to start the data recording. A step S83 receives the data from the host computer, so as to detect the ATIP signal, decode the ATIP signal to reproduce the information included in the ATIP signal and to detect the ATIP error, and to measure the ATIP error rate. A step S84 decides whether or not the ATIP error rate has increased and is large.

If the decision result in the step S84 is NO, a step S85 decides whether or not a data write operation is ended. If the decision result in the step S85 is NO, the process returns to the step S82 to continue the data write operation. On the other hand, if the decision result in the step S85 is YES, a step S86 carries out a write stop operation to end the data recording, and the process ends.

In addition, if the decision result in the step S84 is YES, a step S87 carries out a write pause operation to temporarily interrupt the data write with respect to the optical disk 1. A step S88 temporarily carries out a seek operation, to move the carriage by a carriage moving operation of the optical disk unit so as to change the lens position.

Then, a step S89 changes the write rate to a write rate (recording rate) which does not increase the ATIP error rate. A step S90 carries out a write restart operation to resume the data write operation with respect to the optical disk 1 in synchronism with the recorded data already recorded on the optical disk 1. The process returns to the step S83 after the step S90, so as to continue the data write operation. Hence, the recording data continuing to the end of the recorded data recorded immediately before the recording was interrupted is recorded so that there is no discontinuity with the recorded data recorded immediately before the recording was interrupted.

When the increase of the ATIP error rate is caused by the rotational speed of the optical disk 1 to which the data are to be recorded, the increase of the ATIP error rate can be avoided by changing the rotational speed of the optical disk 1. Consequently, it is possible to stably carry out the data recording (write) without having to enter the loop which repeats the write pause and restart operations.

Therefore, when an increase of the ATIP error rate during the data recording is caused by the rotational speed of the optical disk 1, it is possible to avoid the increase of the ATIP error rate by changing the rotational speed of the optical disk 1, and it is possible to carry out a stable data recording and to avoid the cause which increases the ATIP error rate.

(2-4) Data Recording Process of Ninth Embodiment

Figure 9:
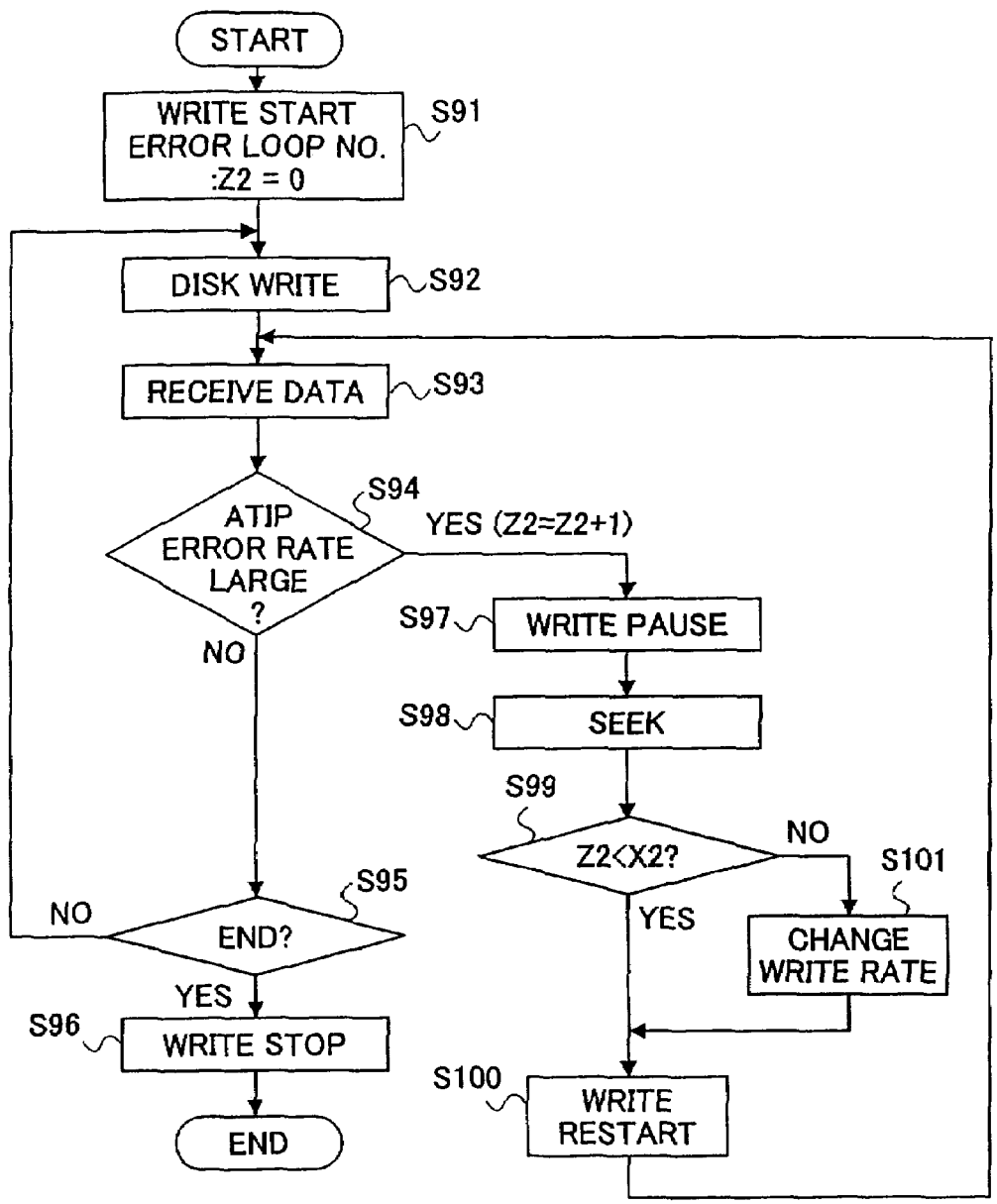
FIG. 9 is a flow chart for explaining an operation of the ninth embodiment of the information storage apparatus.

FIG. 9 is a flow chart for explaining a data recording process of the ninth embodiment of the optical disk unit shown in FIG. 1.

The data recording process starts from a step S91 which carries out a write start operation and initially sets an error loop number Z2 to Z2=0. A step S92 carries out a disk write operation to start the data recording. A step S93 receives the data from the host computer, so as to detect the ATIP signal, decode the ATIP signal to reproduce the information included in the ATIP signal and to detect the ATIP error, and to measure the ATIP error rate. A step S94 decides whether or not the ATIP error rate has increased and is large.

If the decision result in the step S94 is NO, a step S95 decides whether or not a data write operation is ended. If the decision result in the step S95 is NO, the process returns to the step S92 to continue the data write operation. On the other hand, if the decision result in the step S95 is YES, a step S96 carries out a write stop operation to end the data recording, and the process ends.

In addition, if the decision result in the step S94 is YES, the error loop number Z2 is incremented to Z2=Z2+1, and a step S97 carries out a write pause operation to temporarily interrupt the data write with respect to the optical disk 1. A step S98 temporarily carries out a seek operation, to move the carriage by a carriage moving operation of the optical disk unit so as to change the lens position, before advancing to a step S99.

The step S99 decides whether or not the error loop number Z2 is less than a predetermined number X2 which is preset, that is, whether or not Z2<X2. If the decision result in the step S99 is YES, a step S100 carries out a write restart operation to resume the data write operation with respect to the optical disk 1 in synchronism with the recorded data already recorded on the optical disk 1, without changing the write rate. The process returns to the step S93 after the step S100, so as to continue the data write operation. Hence, the recording data continuing to the end of the recorded data recorded immediately before the recording was interrupted is recorded so that there is no discontinuity with the recorded data recorded immediately before the recording was interrupted.

On the other hand, if the decision result in the step S99 is NO, a step S101 changes the write rate to a write rate (recording rate) which does not increase the ATIP error rate, and the process advances to the step S100. The step S100 carries out a write restart operation to resume the data write operation with respect to the optical disk 1 in synchronism with the recorded data already recorded on the optical disk 1, with the changed write rate. The process returns to the step S93 after the step S100, so as to continue the data write operation. Hence, the recording data continuing to the end of the recorded data recorded immediately before the recording was interrupted is recorded so that there is no discontinuity with the recorded data recorded immediately before the recording was interrupted.

Accordingly, the write operation is carried out at the initially set write rate until it is judged that the ATIP error rate is large a predetermined number of times, and the write rate will not be changed unnecessarily every time it is judged that the ATIP error rate is large, to thereby prevent the write time from becoming unnecessarily long.

Furthermore, when the increase of the ATIP error rate is detected consecutively, it is possible to carry out a stable write operation by changing the write rate.

Accordingly, when the increase of the ATIP error rate is detected the predetermined number of times or greater (at least two or more times) during the data recording, it is possible to carry out the data recording stably at a high speed as much as possible, without greatly decreasing the recording rate when changing the recording rate. Hence, the increase of the ATIP error rate dependent on the rotational speed of the optical disk 1 can be avoided.

(3) Tenth Through Fifteenth Embodiments

Figure 10:
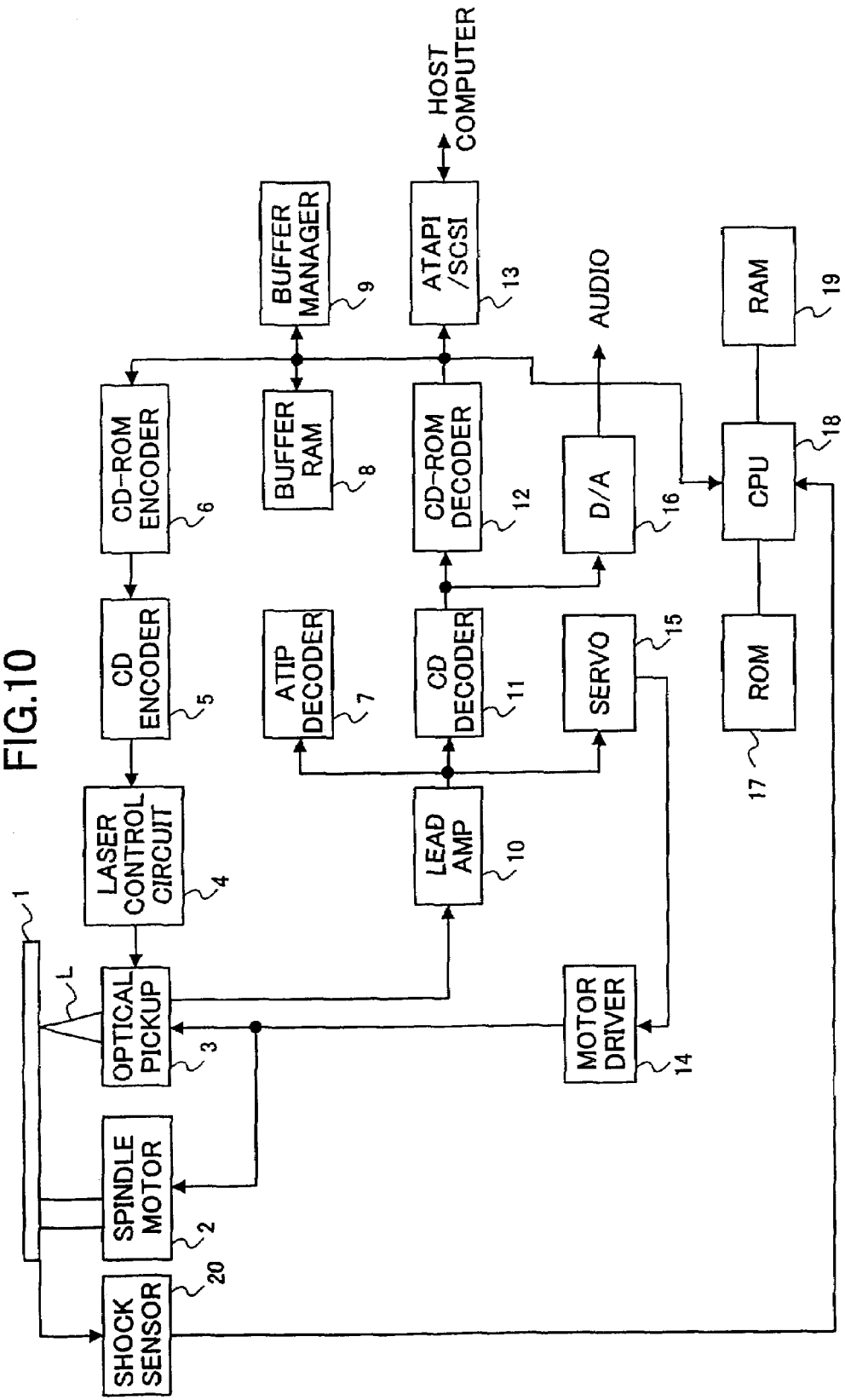
FIG. 10 is a system block diagram for explaining tenth through fifteenth embodiments of the information storage apparatus according to the present invention.

FIG. 10 is a system block diagram for explaining tenth through fifteenth embodiments of the information storage apparatus according to the present invention. In the tenth through fifteenth embodiments, the present invention is applied to an optical disk unit. In FIG. 10, those parts which are the same as those corresponding parts in FIG. 1 are designated by the same reference numerals, and a description thereof will be omitted.

In the tenth through fifteenth embodiments, the optical disk unit shown in FIG. 10 is further provided with a shock sensor 20 in addition to the elements of the optical disk unit shown in FIG. 1.

The shock sensor 20 detects a shock, vibration or the like applied to the optical disk unit when carrying out the data recording, data reproduction or data erasure. The detected shock, vibration or the like is notified from the shock sensor 20 to the CPU 18.

When recording the data in the optical disk unit of the tenth through fifteenth embodiments, the data transferred from the host computer and received by the ATAPI/SCSI interface 13 are temporarily stored in the buffer RAM 8 by the buffer manager 9.

The recording is started when a certain amount of data is stored in the buffer RAM 8, but before starting the recording, the laser spot is positioned to a write start position on the optical disk 1. The write start position is obtained from a wobble signal which is prerecorded in the form of a wave-shaped track on the optical disk 1. The wobble signal includes absolute time information called ATIP, and the ATIP information is obtained by the ATIP decoder 7.

A synchronizing signal generated from the ATIP decoder 7 is input to the CD encoder 5, so that the data can be written at an accurate position.

The data stored in the buffer RAM 8 are subjected to processes, such as adding an error correction code and interleaving, in the CD-ROM encoder 6 and the CD encoder 5, and is recorded on the optical disk 1 via the laser control circuit 4 and the optical pickup 3.

When the shock, vibration or the like is applied to the optical disk unit during the data recording, a recording error may be generated due to an off-servo state of the servo circuit 15 or a deviation from a synchronized state.

Particularly in the case of a data recording with respect to a write-once optical disk such as the CD-R, when the recording error is generated, the recorded optical disk cannot be reused and is thus wasted.

Accordingly, when the CPU 18 detects that the shock sensor 20 has detected the shock, vibration or the like, the CPU 18 temporarily interrupts the data recording. When the shock, vibration or the like is no longer detected, the CPU 18 synchronizes the recording data which are to be newly recorded to the recorded data already recorded on the optical disk 1. Furthermore, the CPU 18 resumes the data recording of the recording data which continues to the recorded data recorded immediately before the interruption of the recording, from the recording start position.

Therefore, the recording error caused by the shock, vibration or the like applied to the optical disk unit during the data recording with respect to the optical disk 1 is prevented from being generated in the optical disk unit.

In other words, this optical disk unit forms an information storage apparatus which can record, reproduce and/or erase information with respect to a recording medium.

The shock sensor 20 functions as a shock and vibration detecting means for detecting the shock, vibration or the like applied with respect to the information storage apparatus.

Furthermore, the CPU 18 and the like function as a data recording resuming means. When the shock and vibration detecting means described above detects the shock, vibration or the like while recording data on the recording medium, this data recording resuming means temporarily interrupts the data recording with respect to the recording medium, and when the shock and vibration detecting means no longer detects the shock, vibration or the like, synchronizes the recording data to the recorded data already recorded on the recording medium, and resumes recording of the recording data continuing without a discontinuity to an end of the recorded data recorded immediately before the interruption of the data recording.

Moreover, the motor driver 14, the servo circuit 15, the CPU 18 and the like function as a rate changing means for changing the recording rate so as not to generate the shock, vibration or the like when resuming the recording by the data recording resuming means described above.

The motor driver 14, the servo circuit 15, the CPU 18 and the like also function as a control means. If the number of times the shock, vibration or the like is detected by the shock and vibration detecting means described above is less than a predetermined number when resuming the recording by the data recording resuming means described above, the control means resumes the recording of the recording data at a recording rate identical to the recording rate immediately before the recording is interrupted. On the other hand, if the number of times the shock, vibration or the like is detected is greater than or equal to the predetermined number, the control means changes the recording rate so as not to generate the shock, vibration or the like.

In addition, the shock sensor 20 functions as a means for detecting the shock, vibration or the like based on the tracking error signal, the focus error signal or a reflectivity detection signal.

(3-1) Data Recording Process of Tenth Embodiment

Figure 11:
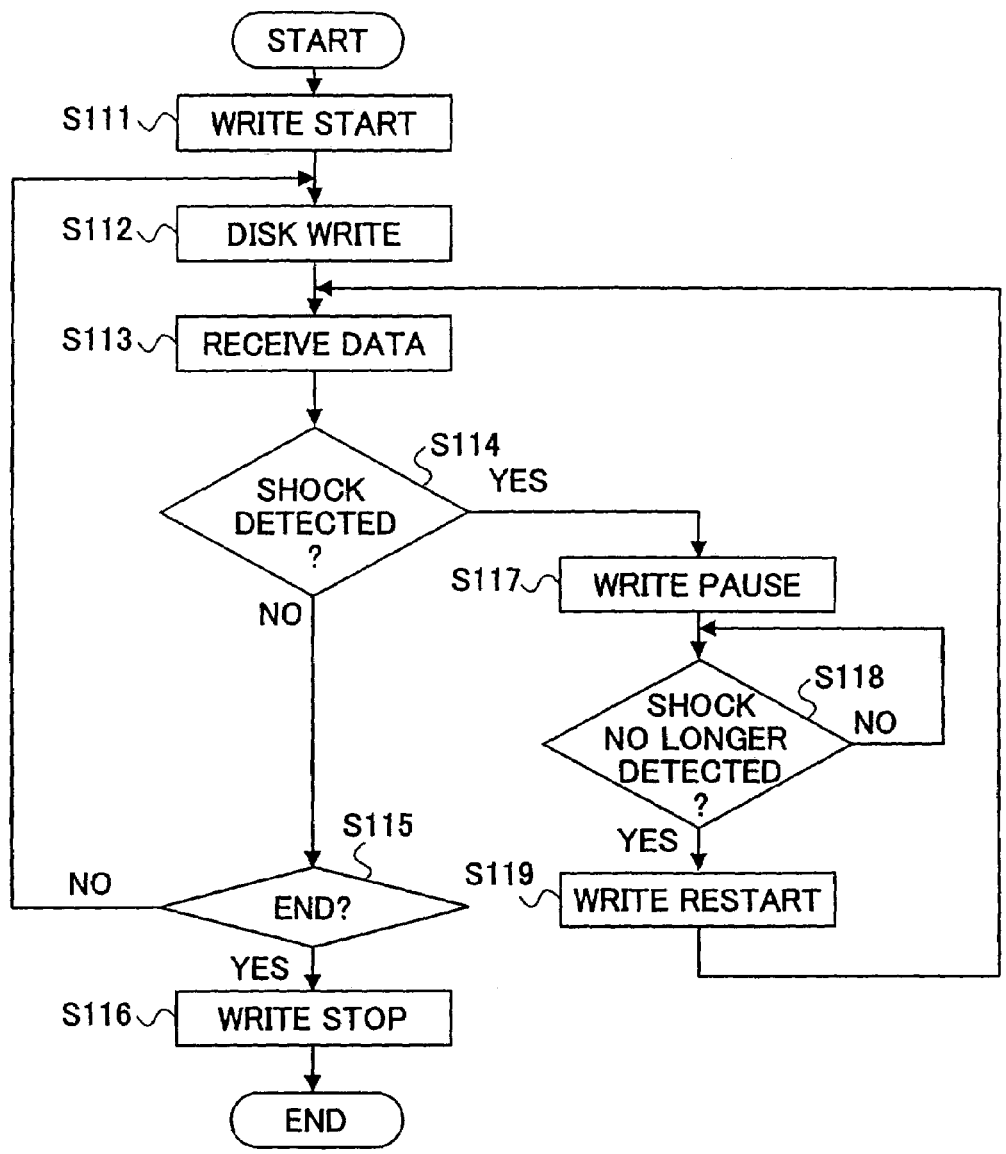
FIG. 11 is a flow chart for explaining an operation of the tenth embodiment of the information storage apparatus.

FIG. 11 is a flow chart for explaining a data recording process of the tenth embodiment of the optical disk unit shown in FIG. 10. FIG. 6 shows the interruption and resuming of the recording when the shock, vibration or the like is detected during the data recording in the optical disk unit shown in FIG. 10.

The data recording process starts from a step S111 which carries out a write start operation. A step S112 carries out a disk write operation to start the data recording. A step S113 receives the data from the host computer, and a step S114 decides whether or not a shock, vibration or the like is detected by the shock sensor 20.

If the decision result in the step S114 is NO, a step S115 decides whether or not a data write operation is ended. If the decision result in the step S115 is NO, the process returns to the step S112 to continue the data write operation. On the other hand, if the decision result in the step S115 is YES, a step S116 carries out a write stop operation to end the data recording, and the process ends.

In addition, if the decision result in the step S114 is YES, a step S117 carries out a write pause operation to temporarily interrupt the data write with respect to the optical disk 1. A step S118 decides whether or not the shock, vibration or the like is no longer detected from the output of the shock sensor 20.

If the shock, vibration or the like is no longer detected and the decision result in the step S118 becomes YES, a step S119 carries out a write restart operation to resume the data write operation with respect to the optical disk 1 in synchronism with the recorded data already recorded on the optical disk 1. The process returns to the step S113 after the step S119, so as to continue the data write operation. Hence, the recording data continuing to the end of the recorded data recorded immediately before the recording was interrupted is recorded so that there is no discontinuity with the recorded data recorded immediately before the recording was interrupted.

Therefore, even if the shock, vibration or the like is applied to the optical disk unit during the data recording, it is possible to continuously record the recording data without a discontinuity, and without generating a recording error.

(3-2) Data Recording Process of Eleventh Embodiment

Figure 12:
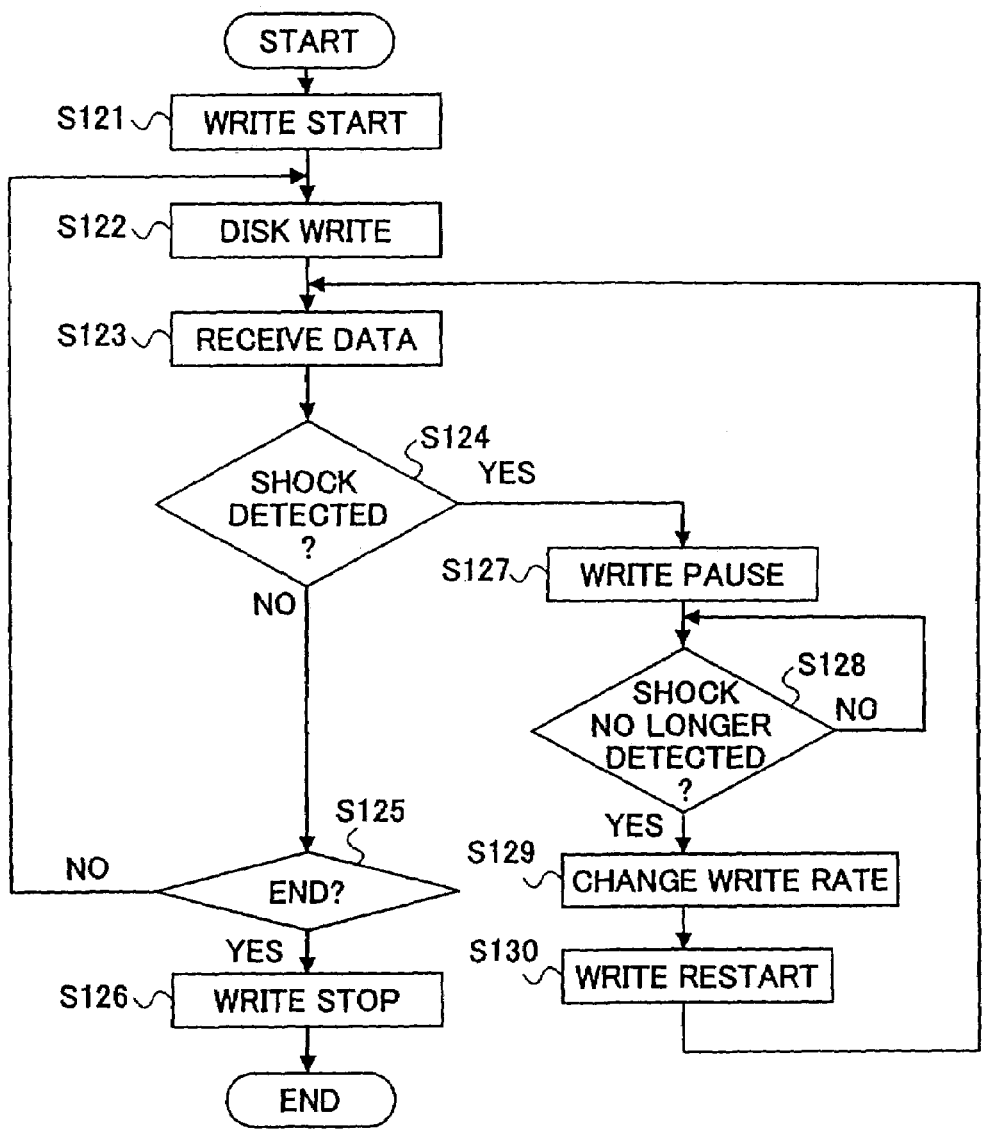
FIG. 12 is a flow chart for explaining an operation of the eleventh embodiment of the information storage apparatus.

FIG. 12 is a flow chart for explaining a data recording process of the eleventh embodiment of the optical disk unit shown in FIG. 10.

The data recording process starts from a step S121 which carries out a write start operation. A step S122 carries out a disk write operation to start the data recording. A step S123 receives the data from the host computer, and a step S124 decides whether or not a shock, vibration or the like is detected by the shock sensor 20.

If the decision result in the step S124 is NO, a step S125 decides whether or not a data write operation is ended. If the decision result in the step S125 is NO, the process returns to the step S122 to continue the data write operation. On the other hand, if the decision result in the step S125 is YES, a step S126 carries out a write stop operation to end the data recording, and the process ends.

In addition, if the decision result in the step S124 is YES, a step S127 carries out a write pause operation to temporarily interrupt the data write with respect to the optical disk 1. A step S128 decides whether or not the shock, vibration or the like is no longer detected from the output of the shock sensor 20.

If the shock, vibration or the like is no longer detected and the decision result in the step S128 becomes YES, a step S129 changes the write rate (recording rate) so as not to generate the shock, vibration or the like. Then, a step S130 carries out a write restart operation to resume the data write operation with respect to the optical disk 1 in synchronism with the recorded data already recorded on the optical disk 1. The process returns to the step S123 after the step S130, so as to continue the data write operation. Hence, the recording data continuing to the end of the recorded data recorded immediately before the recording was interrupted is recorded so that there is no discontinuity with the recorded data recorded immediately before the recording was interrupted.

In a case where the shock, vibration or the like is caused by the rotational speed of the optical disk 1, even if the write pause operation is temporarily carried out and the write restart operation is carried out after the shock, vibration or the like is no longer detected as in the case of the flow chart shown in FIG. 11, the shock, vibration or the like will be generated again if the conditions match, and the process will enter the loop of the write pause and restart operations.

But when the write rate is changed when the shock, vibration or the like is detected in the step S124 as shown in the flow chart of FIG. 12, it is possible to avoid the shock, vibration or the like caused by the rotational speed of the optical disk 1. As a result, the number of times the process enters the loop of the write pause and restart operations is reduced, and it is possible to carry out a stable data recording (write).

Therefore, even if the shock, vibration or the like is applied to the optical disk unit during the data recording is caused by the rotational speed of the optical disk 1, it is possible to stably record the recording data without generating the shock, vibration or the like.

(3-3) Data Recording Process of Twelfth Embodiment

Figure 13:
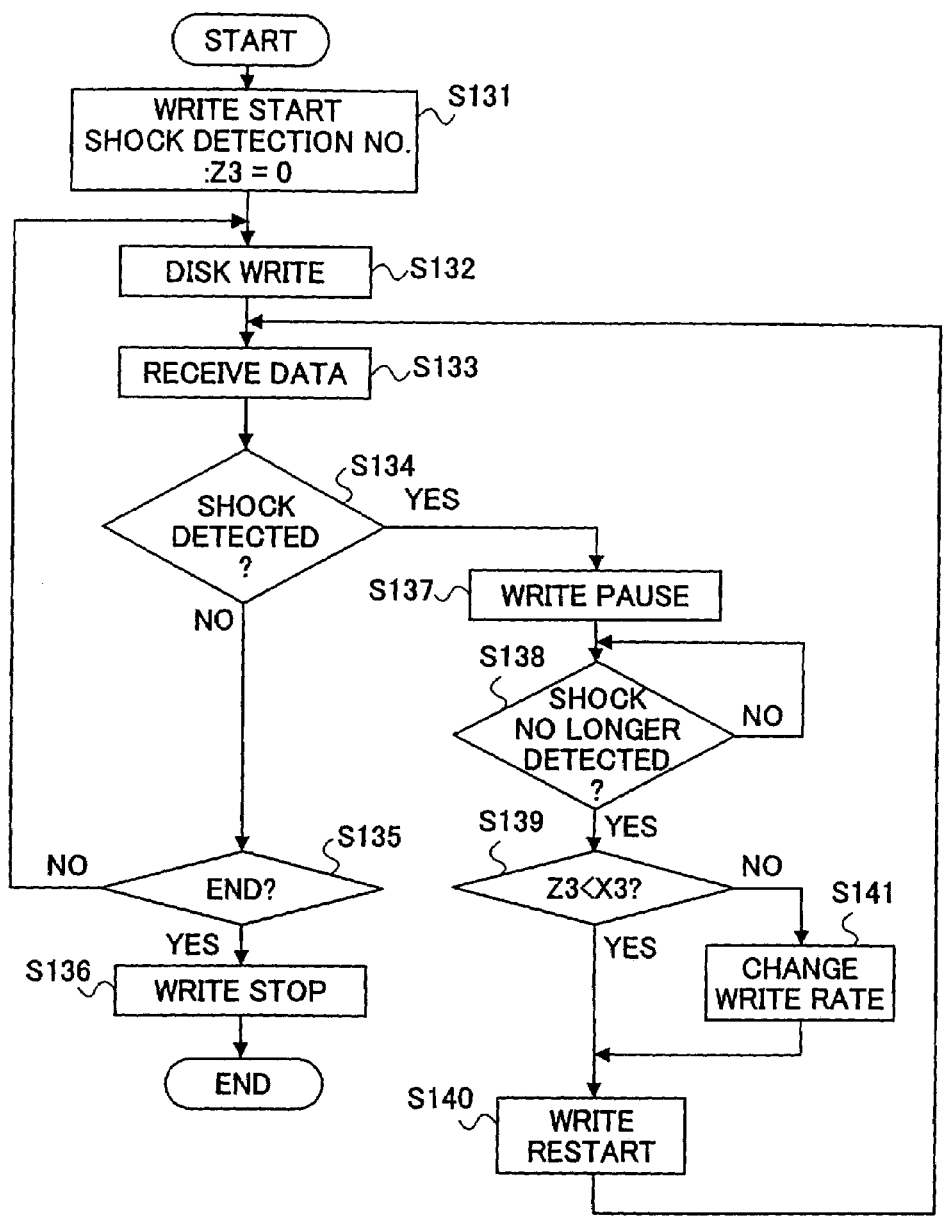
FIG. 13 is a flow chart for explaining an operation of the twelfth embodiment of the information storage apparatus.

FIG. 13 is a flow chart for explaining a data recording process of the twelfth embodiment of the optical disk unit shown in FIG. 10.

The data recording process starts from a step S131 which carries out a write start operation and initially sets a shock detection number Z3 to Z3=0. A step S132 carries out a disk write operation to start the data recording. A step S133 receives the data from the host computer, and a step S134 decides whether or not a shock, vibration or the like is detected by the shock sensor 20.

If the decision result in the step S134 is NO, a step S135 decides whether or not a data write operation is ended. If the decision result in the step S135 is NO, the process returns to the step S132 to continue the data write operation. On the other hand, if the decision result in the step S135 is YES, a step S136 carries out a write stop operation to end the data recording, and the process ends.

In addition, if the decision result in the step S134 is YES, a step S137 carries out a write pause operation to temporarily interrupt the data write with respect to the optical disk 1. A step S138 decides whether or not the shock, vibration or the like is no longer detected from the output of the shock sensor 20.

If the shock, vibration or the like is no longer detected and the decision result in the step S138 becomes YES, the process advances to a step S139.

The step S139 decides whether or not the shock detection number Z3 is less than a predetermined number X3 which is preset, that is, whether or not Z3<X3. If the decision result in the step S139 is YES, a step S140 carries out a write restart operation to resume the data write operation with respect to the optical disk 1 in synchronism with the recorded data already recorded on the optical disk 1, without changing the write rate. The process returns to the step S133 after the step S140, so as to continue the data write operation. Hence, the recording data continuing to the end of the recorded data recorded immediately before the recording was interrupted is recorded so that there is no discontinuity with the recorded data recorded immediately before the recording was interrupted.

On the other hand, if the decision result in the step S139 is NO, a step S141 changes the write rate (recording rate) so as not to generate the shock, vibration or the like.

After the step S141, the process advances to the step S140 which carries out a write restart operation to resume the data write operation with respect to the optical disk 1 in synchronism with the recorded data already recorded on the optical disk 1, with the changed write rate. The process returns to the step S133 after the step S140, so as to continue the data write operation. Hence, the recording data continuing to the end of the recorded data recorded immediately before the recording was interrupted is recorded so that there is no discontinuity with the recorded data recorded immediately before the recording was interrupted.

Accordingly, the write operation is carried out at the initially set write rate until the shock, vibration or the like is detected the predetermined number of times, and the write rate will not be changed unnecessarily every time the shock, vibration or the like is detected, to thereby prevent the write-time from becoming unnecessarily long.

Furthermore, when the shock, vibration or the like is detected consecutively, it is possible to carry out a stable write operation by changing the write rate.

Accordingly, when the shock, vibration or the like is detected the predetermined number of times or greater during the data recording, it is possible to carry out the data recording stably at a high speed as much as possible, without greatly decreasing the recording rate when changing the recording rate. Hence, the cause which generates the shock, vibration or the like can be eliminated.

(3-4) Data Recording Process of Thirteenth Embodiment

A data recording process of the thirteenth embodiment is basically the same as the data recording process shown in FIG. 11, 12 or 13, except for the shock detection process which detects the shock, vibration or the like.

In the data recording process of this thirteenth embodiment, the shock detection process of the steps S114 and S118 shown in FIG. 11, the steps S124 and S128 shown in FIG. 12, or the steps S134 and S138 shown in FIG. 13 is carried out based on the tracking error signal which is obtained from the servo circuit 15 shown in FIG. 10.

Normally, the tracking error signal during a stable data recording in the optical disk unit has a constant value. But when the shock, vibration or the like is applied to the optical disk unit, the tracking error signal is distorted, and a signal level of the tracking error signal may change.

Accordingly, it is judged that the shock, vibration or the like is detected when the tracking error signal is offset by a predetermined threshold value from a signal level of the tracking error signal during the stable data recording. When the shock, vibration or the like is detected in this manner, the data recording is temporarily interrupted, and when the shock, vibration or the like is no longer detected, the recording data which are to be newly recorded are synchronized to the recorded data already recorded on the optical disk 1. Furthermore, the data recording of the recording data which continues to the recorded data recorded immediately before the interruption of the recording, is resumed from the recording start position. As a result, it is possible to carry out a stable data recording, by preventing the data to be recorded on the optical disk 1 in an off-servo state.

In other words, the shock, vibration or the like during the data recording can be detected based on the tracking error signal, without having to provide a redundant circuit such as the shock sensor, thereby making it possible to provide an inexpensive optical disk unit having a simple structure.

(3-5) Data Recording Process of Fourteenth Embodiment

A data recording process of the fourteenth embodiment is basically the same as the data recording process shown in FIG. 11, 12 or 13, except for the shock detection process which detects the shock, vibration or the like and is further different from the thirteenth embodiment.

In the data recording process of this fourteenth embodiment, the shock detection process of the steps S114 and S118 shown in FIG. 11, the steps S124 and S128 shown in FIG. 12, or the steps S134 and S138 shown in FIG. 13 is carried out based on the focus error signal which is obtained from the servo circuit 15 shown in FIG. 10.

Normally, the focus error signal during a stable data recording in the optical disk unit has a constant value. But when the shock, vibration or the like is applied to the optical disk unit, the focus error signal is distorted, and a signal level of the focus error signal may change.

Accordingly, it is judged that the shock, vibration or the like is detected when the focus error signal is offset by a predetermined threshold value from a signal level of the focus error signal during the stable data recording. When the shock, vibration or the like is detected in this manner, the data recording is temporarily interrupted, and when the shock, vibration or the like is no longer detected, the recording data which are to be newly recorded are synchronized to the recorded data already recorded on the optical disk 1. Furthermore, the data recording of the recording data which continues to the recorded data recorded immediately before the interruption of the recording, is resumed from the recording start position. As a result, it is possible to carry out a stable data recording, by preventing the data to be recorded on the optical disk 1 in an off-servo state.

In other words, the shock, vibration or the like during the data recording can be detected based on the focus error signal, without having to provide a redundant circuit such as the shock sensor, thereby making it possible to provide an inexpensive optical disk unit having a simple structure.

(3-6) Data Recording Process of Fifteenth Embodiment

A data recording process of the fifteenth embodiment is basically the same as the data recording process shown in FIG. 11, 12 or 13, except for the shock detection process which detects the shock, vibration or the like and is further different from the thirteenth and fourteenth embodiments.

In the data recording process of this fifteenth embodiment, the shock detection process of the steps S114 and S118 shown in FIG. 11, the steps S124 and S128 shown in FIG. 12, or the steps S134 and S138 shown in FIG. 13 is carried out based on the reflectivity detection signal which is obtained from the servo circuit 15 shown in FIG. 10.

Normally, the reflectivity detection signal during a stable data recording in the optical disk unit has a constant value. But when the shock, vibration or the like is applied to the optical disk unit, the reflectivity detection signal is distorted, and a signal level of the reflectivity detection signal may change.

Accordingly, it is judged that the shock, vibration or the like is detected when the reflectivity detection signal is offset by a predetermined threshold value from a signal level of the reflectivity detection signal during the stable data recording. When the shock, vibration or the like is detected in this manner, the data recording is temporarily interrupted, and when the shock, vibration or the like is no longer detected, the recording data which are to be newly recorded are synchronized to the recorded data already recorded on the optical disk 1. Furthermore, the data recording of the recording data which continues to the recorded data recorded immediately before the interruption of the recording, is resumed from the recording start position. As a result, it is possible to carry out a stable data recording, by preventing the data to be recorded on the optical disk 1 in an off-servo state.

In other words, the shock, vibration or the like during the data recording can be detected based on the reflectivity detection signal, without having to provide a redundant circuit such as the shock sensor, thereby making it possible to provide an inexpensive optical disk unit having a simple structure.

(4) Sixteenth Through Nineteenth Embodiments

Figure 14:
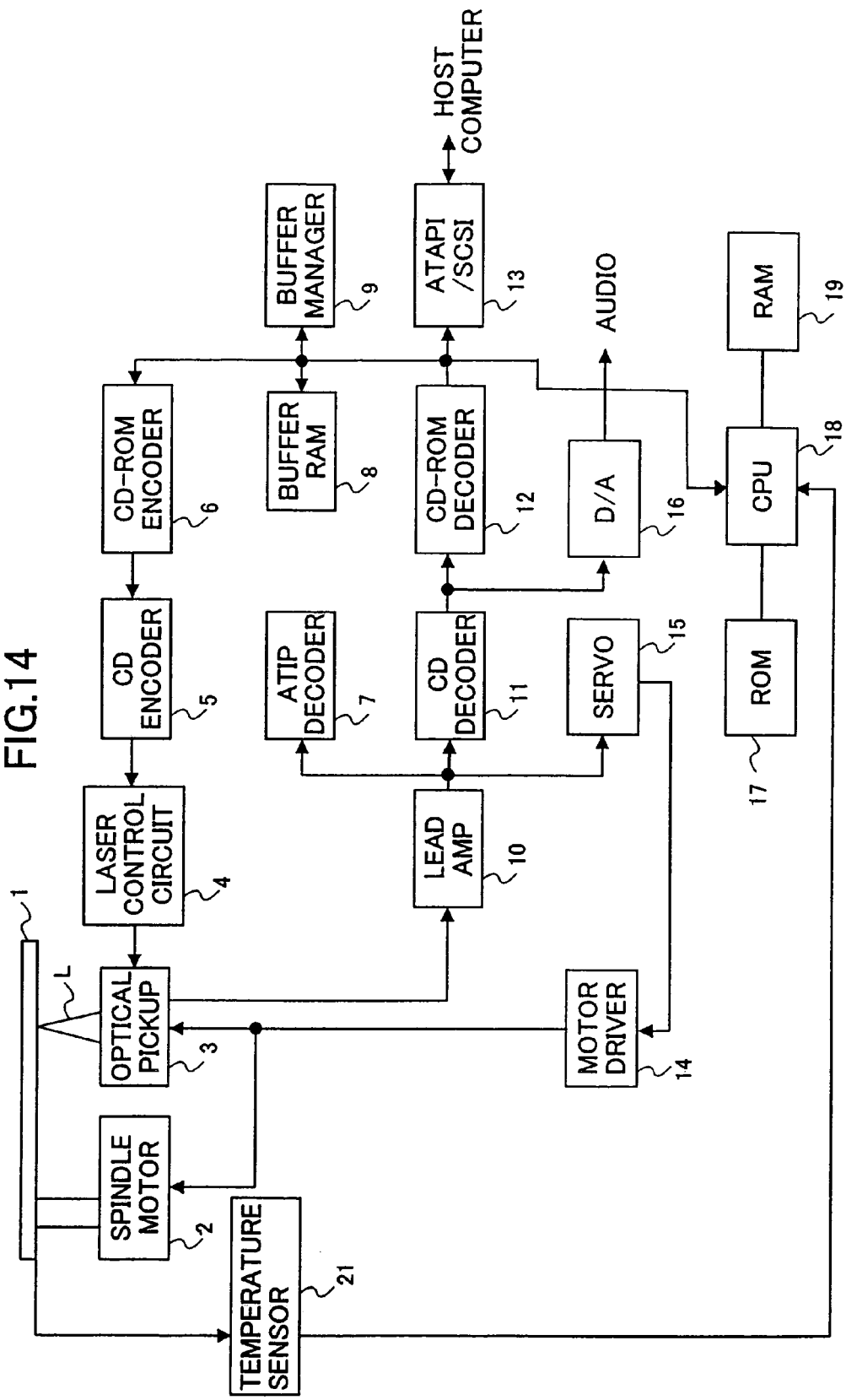
FIG. 14 is a system block diagram for explaining sixteenth through nineteenth embodiments of the information storage apparatus according to the present invention.

FIG. 14 is a system block diagram for explaining sixteenth through nineteenth embodiments of the information storage apparatus according to the present invention. In the sixteenth through nineteenth embodiments, the present invention is applied to an optical disk unit. In FIG. 14, those parts which are the same as those corresponding parts in FIG. 1 are designated by the same reference numerals, and a description thereof will be omitted.

In the sixteenth through nineteenth embodiments, the optical disk unit shown in FIG. 14 is further provided with a temperature sensor 21 in addition to the elements of the optical disk unit shown in FIG. 1.

The temperature sensor 21 detects a temperature within the optical disk unit when carrying out the data recording, data reproduction or data erasure. The detected temperature is notified from the temperature sensor 21 to the CPU 18.

When recording the data in the optical disk unit of the tenth through fifteenth embodiments, the data transferred from the host computer and received by the ATAPI/SCSI interface 13 are temporarily stored in the buffer RAM 8 by the buffer manager 9.

The recording is started when a certain amount of data is stored in the buffer RAM 8, but before starting the recording, the laser spot is positioned to a write start position on the optical disk 1. The write start position is obtained from a wobble signal which is prerecorded in the form of a wave-shaped track on the optical disk 1. The wobble signal includes absolute time information called ATIP, and the ATIP information is obtained by the ATIP decoder 7.

A synchronizing signal generated from the ATIP decoder 7 is input to the CD encoder 5, so that the data can be written at an accurate position.

The data stored in the buffer RAM 8 are subjected to processes, such as adding an error correction code and interleaving, in the CD-ROM encoder 6 and the CD encoder 5, and is recorded on the optical disk 1 via the laser control circuit 4 and the optical pickup 3.

When the temperature becomes high within the optical disk unit during the data recording, a light utilization efficiency of the laser diode (or light emitting element, not shown) included in the optical pickup 3 changes, to thereby deteriorate the recording quality of the data or generate a recording error.

In order to main a satisfactory recording quality, it becomes necessary to increase the light emission power of the laser diode, which results in shortening the serviceable life of the laser diode.

Particularly in the case of a data recording with respect to a write-once optical disk such as the CD-R, when the recording error is generated, the recorded optical disk cannot be reused and is thus wasted.

Accordingly, when the CPU 18 detects that the temperature within the optical disk unit has become high based on the output of the temperature sensor 21, vibration or the like, the CPU 18 temporarily interrupts the data recording. When the CPU 18 detects that the temperature within the optical disk unit is no longer high based on the output of the temperature sensor 21, the CPU 18 synchronizes the recording data which are to be newly recorded to the recorded data already recorded on the optical disk 1. Furthermore, the CPU 18 resumes the data recording of the recording data which continues to the recorded data recorded immediately before the interruption of the recording, from the recording start position.

Therefore, deterioration of the recording quality and the recording error caused by the high temperature within the optical disk unit during the data recording with respect to the optical disk 1 is prevented from being generated in the optical disk unit.

In other words, this optical disk unit forms an information storage apparatus which can record, reproduce and/or erase information with respect to a recording medium.

The temperature sensor 21 functions as a temperature measuring means for measuring the temperature within the information storage apparatus.

Furthermore, the CPU 18 and the like function as a data recording resuming means. When the temperature measuring means described above measures a high temperature which is greater than or equal to a predetermined temperature while recording data on the recording medium, this data recording resuming means temporarily interrupts the data recording with respect to the recording medium, and when the temperature measured by the temperature measuring means becomes less than the predetermined temperature, synchronizes the recording data to the recorded data already recorded on the recording medium, and resumes recording of the recording data continuing without a discontinuity to an end of the recorded data recorded immediately before the interruption of the data recording.

In addition, the CPU 18 and the like functions as a means for detecting a high temperature state when a difference between the temperature measured by the temperature measuring means described above during the data recording and an initial temperature measured before the start of the data recording exceeds a predetermined threshold value.

Moreover, the motor driver 14, the servo circuit 15, the CPU 18 and the like function as a rate changing means for changing the recording rate so as not to generate the high temperature state when resuming the recording by the data recording resuming means described above.

The motor driver 14, the servo circuit 15, the CPU 18 and the like also function as a control means. If the number of times the high temperature state described above is detected is less than a predetermined number when resuming the recording by the data recording resuming means described above, the control means resumes the recording of the recording data at a recording rate identical to the recording rate immediately before the recording is interrupted. On the other hand, if the number of times the high temperature state is detected is greater than or equal to the predetermined number, the control means reduces the recording rate in steps so as not to generate the high temperature state.

(4-1) Data Recording Process of Sixteenth Embodiment

Figure 15:
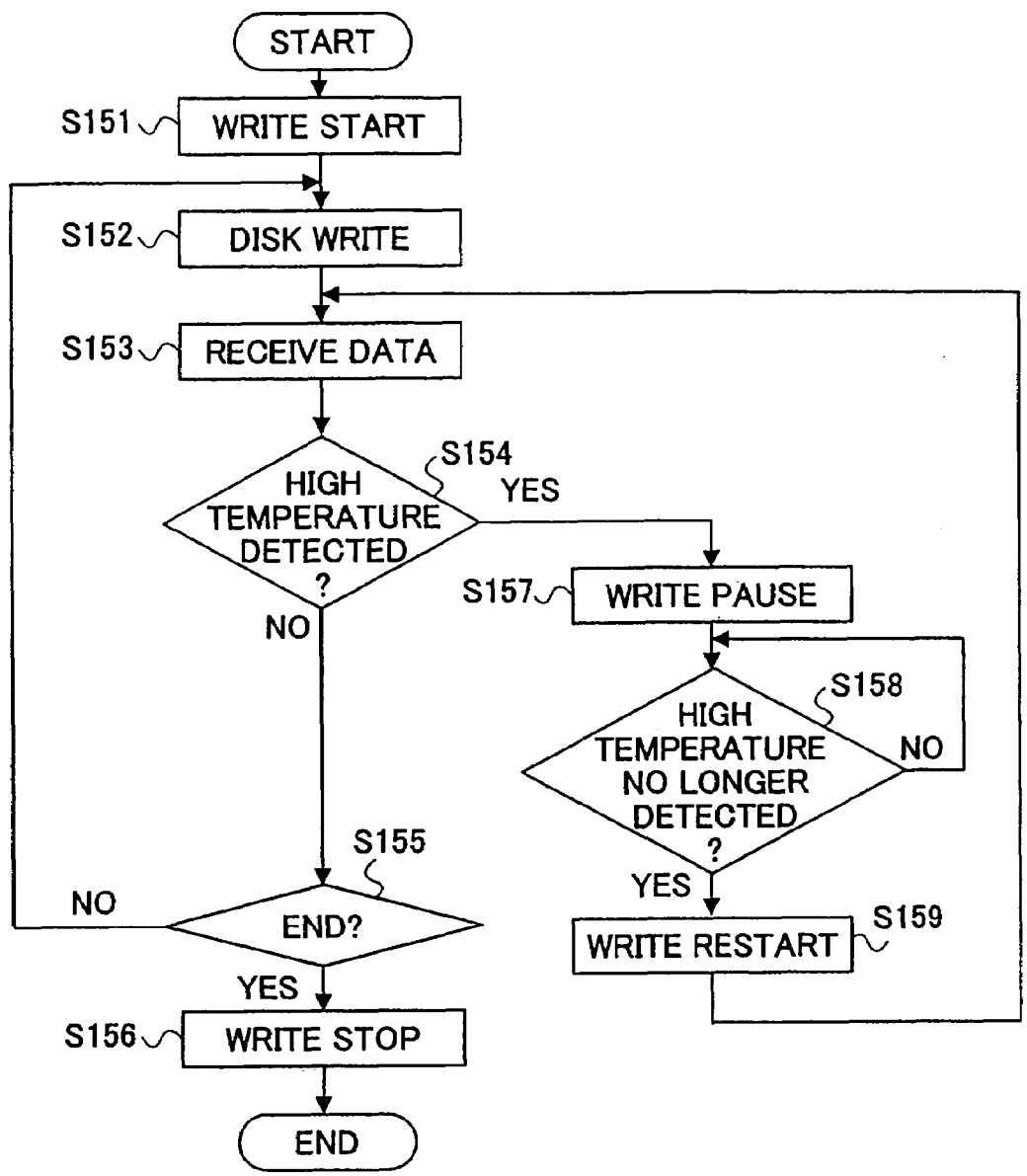
FIG. 15 is a flow chart for explaining an operation of the sixteenth embodiment of the information storage apparatus.

FIG. 15 is a flow chart for explaining a data recording process of the sixteenth embodiment of the optical disk unit shown in FIG. 14. FIG. 15 shows the interruption and resuming of the recording when the high temperature state is detected during the data recording in the optical disk unit shown in FIG. 14.

The data recording process starts from a step S151 which carries out a write start operation. A step S152 carries out a disk write operation to start the data recording. A step S153 receives the data from the host computer, and a step S154 decides whether or not a high temperature state is detected by the temperature sensor 21.

If the decision result in the step S154 is NO, a step S155 decides whether or not a data write operation is ended. If the decision result in the step S155 is NO, the process returns to the step S152 to continue the data write operation. On the other hand, if the decision result in the step S155 is YES, a step S156 carries out a write stop operation to end the data recording, and the process ends.

In addition, if the decision result in the step S154 is YES, a step S157 carries out a write pause operation to temporarily interrupt the data write with respect to the optical disk 1. A step S158 decides whether or not the high temperature state is no longer detected from the output of the temperature sensor 21.

If the high temperature state is no longer detected and the decision result in the step S158 becomes YES, a step S159 carries out a write restart operation to resume the data write operation with respect to the optical disk 1 in synchronism with the recorded data already recorded on the optical disk 1. The process returns to the step S153 after the step S159, so as to continue the data write operation. Hence, the recording data continuing to the end of the recorded data recorded immediately before the recording was interrupted is recorded so that there is no discontinuity with the recorded data recorded immediately before the recording was interrupted.

Therefore, even if the temperature within the optical disk unit becomes high during the data recording, it is possible to continuously record the recording data with a stable quality without a discontinuity, and without generating a recording error.

(4-2) Data Recording Process of Seventeenth Embodiment

Figure 16:
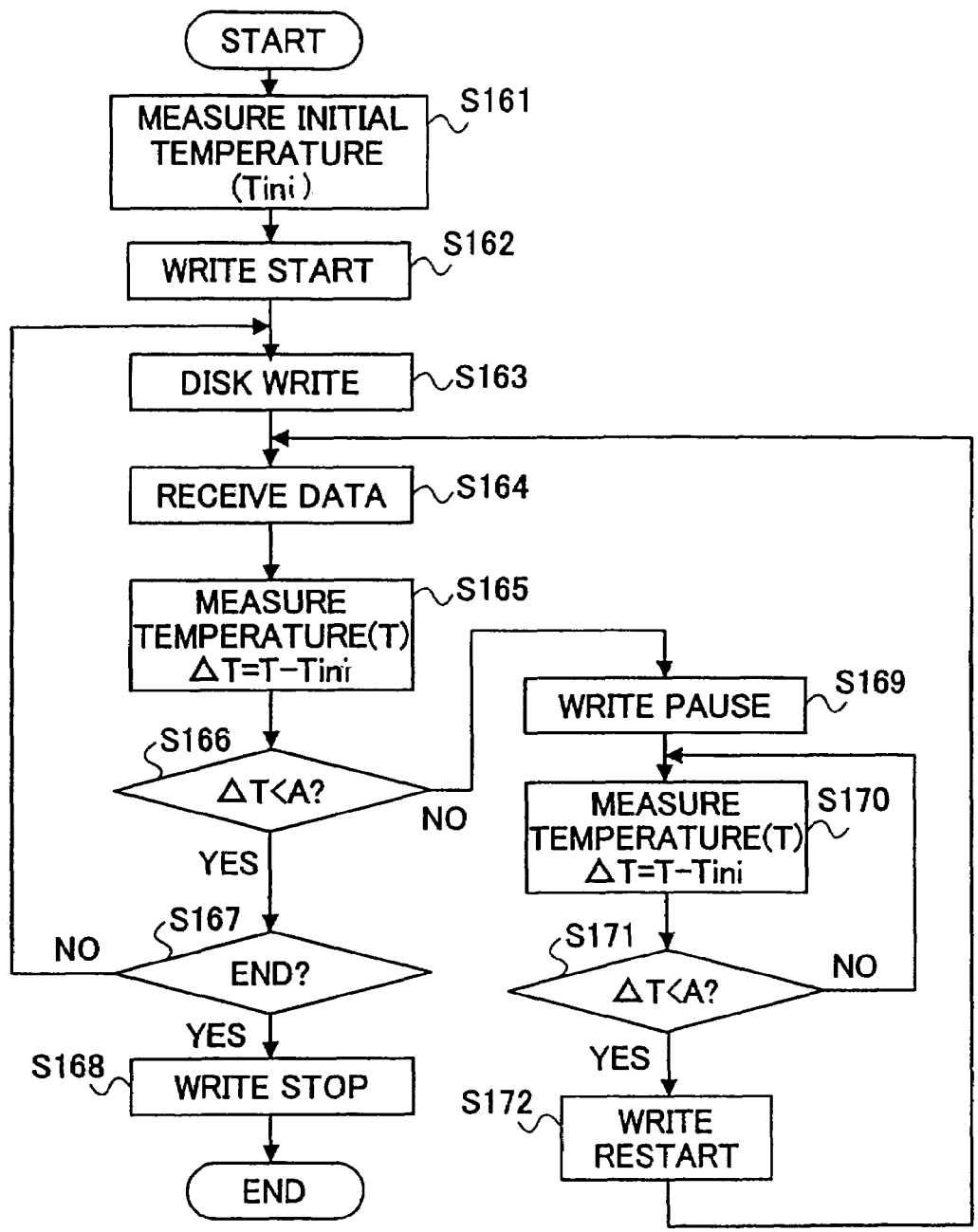
FIG. 16 is a flow chart for explaining an operation of the seventeenth embodiment of the information storage apparatus.

FIG. 16 is a flow chart for explaining a data recording process of the seventeenth embodiment of the optical disk unit shown in FIG. 14.

The data recording process starts from a step S161 which measures an initial temperature Tini within the optical disk unit by the temperature sensor 21 before the start of the data recording. A step S162 carries out a write start operation, and a step S163 carries out a disk write operation to start the data recording. A step S164 receives the data from the host computer, and a step S165 measures the temperature by the temperature sensor 21 during the data recording, and calculates a temperature deviation $\Delta T=T-Tini$ which is a difference between the temperature T measured during the data recording and the initial temperature Tini. The process then advances to a step S166.

The step S166 decides whether or not the temperature deviation $\Delta T$ is smaller than a predetermined temperature threshold value A which is preset. If the decision result in the step S166 is YES, a step S167 decides whether or not a data write operation is ended. If the decision result in the step S167 is NO, the process returns to the step S163 to continue the data write operation. On the other hand, if the decision result in the step S167 is YES, a step S168 carries out a write stop operation to end the data recording, and the process ends.

In addition, if the decision result in the step S166 is NO, a step S169 carries out a write pause operation to temporarily interrupt the data write with respect to the optical disk 1. A step S170 measures the temperature within the optical disk unit again by the temperature sensor 21, and calculates the temperature deviation ΔT similarly as described above. The process then advances to a step S171 which decides whether or not the temperature deviation ΔT is smaller than the predetermined temperature threshold value A.

The process returns to the step S170 if the decision result in the step S171 is NO.

If the decision result in the step S171 is YES, a step S172 carries out a write restart operation to resume the data write operation with respect to the optical disk 1 in synchronism with the recorded data already recorded on the optical disk 1. The process returns to the step S164 after the step S172, so as to continue the data write operation. Hence, the recording data continuing to the end of the recorded data recorded immediately before the recording was interrupted is recorded so that there is no discontinuity with the recorded data, recorded immediately before the recording was interrupted.

Therefore, by measuring the temperature of the optical disk unit before the start of the data recording, it is possible to detect the high temperature state based on the temperature deviation from the temperature before the start of the data recording when the temperature of the optical disk unit rises during the data recording, and to control the recording, interruption and resuming of the data recording. For this reason, it is possible to carry out a stable recording (write) without unnecessarily interrupting and resuming the data recording, regardless of the temperature state within the optical disk unit before the start of the data recording.

Hence, by interrupting the data recording when the temperature within the optical disk unit changes to the high temperature state, regardless of the temperature before the start of the data recording, it is possible to prevent unnecessary interruption and resuming of the data recording every time the temperature rises. In other words, it is possible to maintain a stable recording quality regardless of the temperature at the time when the data recording is started.

(4-3) Data Recording Process of Eighteenth Embodiment

Figure 17:
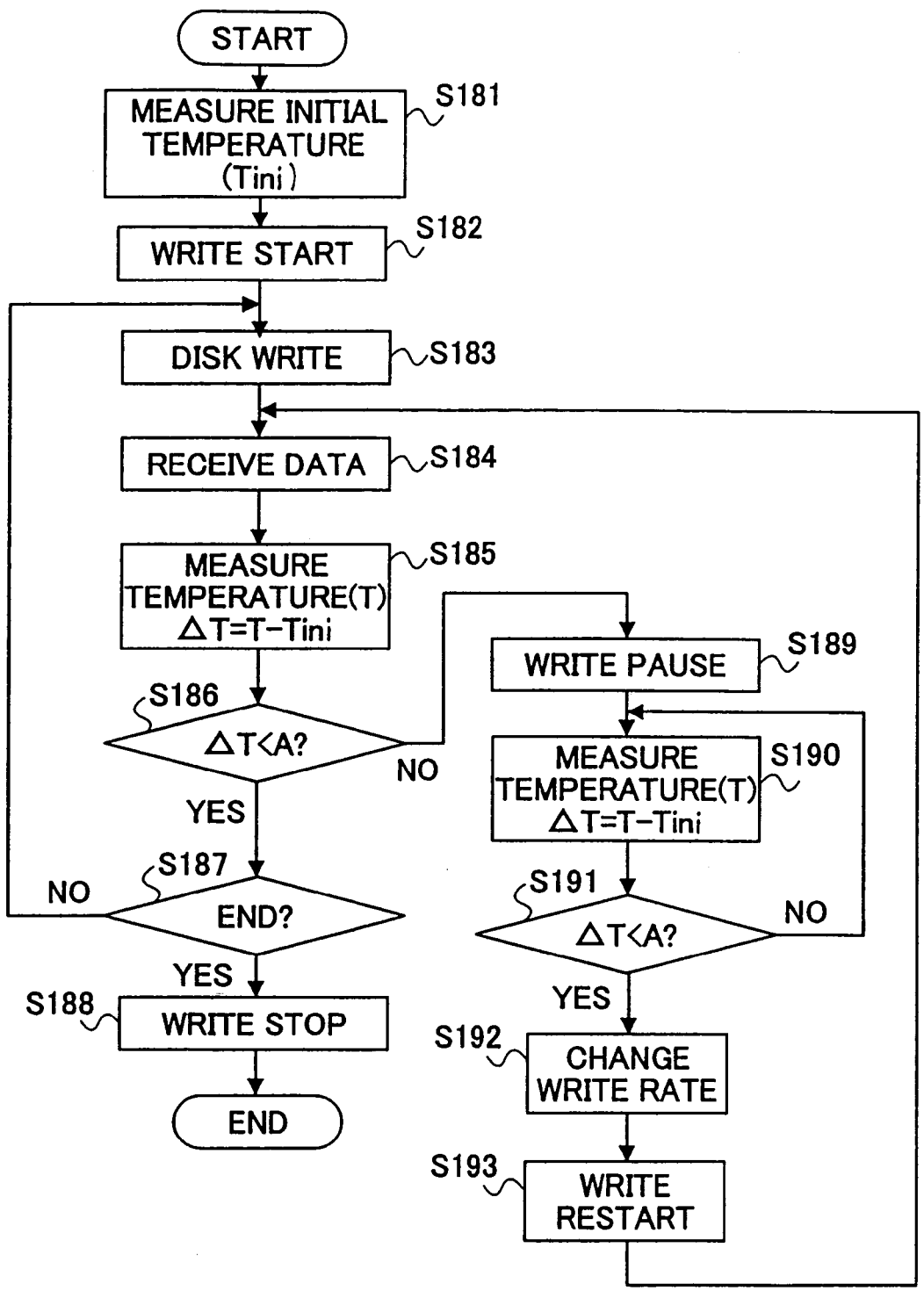
FIG. 17 is a flow chart for explaining an operation of the eighteenth embodiment of the information storage apparatus.

FIG. 17 is a flow chart for explaining a data recording process of the eighteenth embodiment of the optical disk unit shown in FIG. 14.

The data recording process starts from a step S181 which measures an initial temperature Tini within the optical disk unit by the temperature sensor 21 before the start of the data recording. A step S182 carries out a write start operation, and a step S183 carries out a disk write operation to start the data recording. A step S184 receives the data from the host computer, and a step S185 measures the temperature by the temperature sensor 21 during the data recording, and calculates a temperature deviation ΔT=T−Tini which is a difference between the temperature T measured during the data recording and the initial temperature Tini. The process then advances to a step S186.

The step S186 decides whether or not the temperature deviation ΔT is smaller than a predetermined temperature threshold value A which is preset. If the decision result in the step S186 is YES, a step S187 decides whether or not a data write operation is ended. If the decision result in the step S187 is NO, the process returns to the step S183 to continue the data write operation. On the other hand, if the decision result in the step S187 is YES, a step S188 carries out a write stop operation to end the data recording, and the process ends.

In addition, if the decision result in the step S186 is NO, a step S189 carries out a write pause operation to temporarily interrupt the data write with respect to the optical disk 1. A step S190 measures the temperature within the optical disk unit again by the temperature sensor 21, and calculates the temperature deviation ΔT similarly as described above. The process then advances to a step S191 which decides whether or not the temperature deviation ΔT is smaller than the predetermined temperature threshold value A.

The process returns to the step S190 if the decision result in the step S191 is NO.

If the decision result in the step S191 is YES, a step S192 reduces the write rate by one step, and the process advances to a step S193. The step S193 carries out a write restart operation to resume the data write operation with respect to the optical disk 1 in synchronism with the recorded data already recorded on the optical disk 1. The process returns to the step S184 after the step S193, so as to continue the data write operation. Hence, the recording data continuing to the end of the recorded data recorded immediately before the recording was interrupted is recorded so that there is no discontinuity with the recorded data recorded immediately before the recording was interrupted.

Therefore, when the temperature rise during the data recording is caused by the rotational speed of the optical disk 1, it is possible to avoid the temperature from rising again by changing the rotational speed of the optical disk 1. As a result, it is possible to carry out a stable data recording, and to avoid the cause of the temperature rise.

(4-4) Data Recording Process of Nineteenth Embodiment

Figure 18:
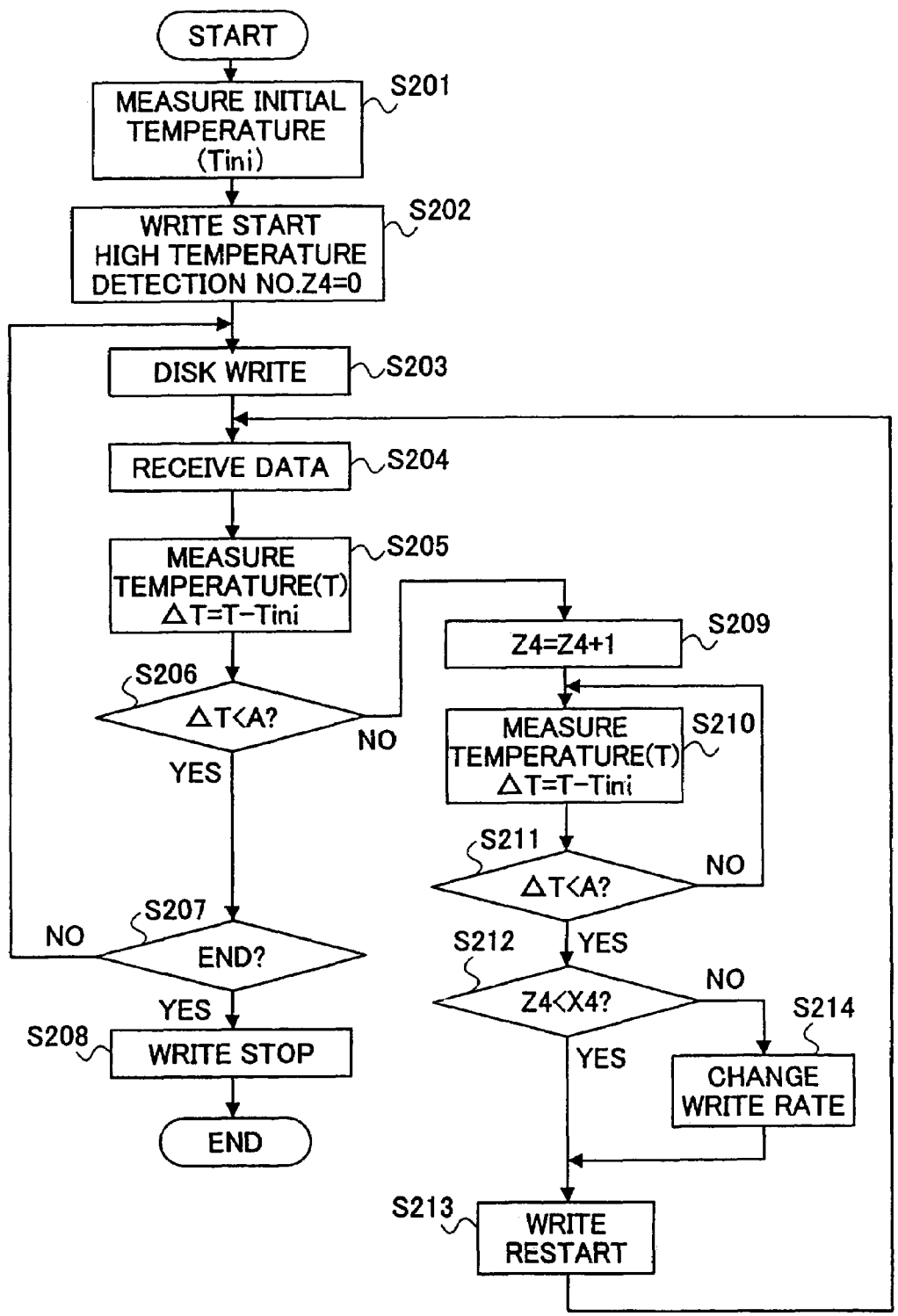
FIG. 18 is a flow chart for explaining an operation of the nineteenth embodiment of the information storage apparatus.

FIG. 18 is a flow chart for explaining a data recording process of the nineteenth embodiment of the optical disk unit shown in FIG. 14.

The data recording process starts from a step S201 which measures an initial temperature Tini within the optical disk unit by the temperature sensor 21 before the start of the data recording. A step S202 carries out a write start operation, and sets a high temperature detection number Z4 in this state to Z4=0.

A step S203 carries out a disk write operation to start the data recording. A step S204 receives the data from the host computer, and a step S205 measures the temperature by the temperature sensor 21 during the data recording, and calculates a temperature deviation ΔT=T−Tini which is a difference between the temperature T measured during the data recording and the initial temperature Tini. The process then advances to a step S206.

The step S206 decides whether or not the temperature deviation ΔT is smaller than a predetermined temperature threshold value A which is preset. If the decision result in the step S206 is YES, a step S207 decides whether or not a data write operation is ended. If the decision result in the step S207 is NO, the process returns to the step S203 to continue the data write operation. On the other hand, if the decision result in the step S207 is YES, a step S208 carries out a write stop operation to end the data recording, and the process ends.

In addition, if the decision result in the step S206 is NO, a step S209 increments the high temperature detection number Z4 to Z4=Z4+1, and carries out a write pause operation to temporarily interrupt the data write with respect to the optical disk 1.

A step S210 measures: the temperature within the optical disk unit again by the temperature sensor 21, and calculates the temperature deviation ΔT similarly as described above. The process then advances to a step S211 which decides whether or not the temperature deviation ΔT is smaller than the predetermined temperature threshold value A.

The process returns to the step S210 if the decision result in the step S211 is NO.

If the decision result in the step S211 is YES, the process advances to a step S212.

The step S212 decides whether or not the high temperature detection number Z4 is less than a predetermined number X4 which is preset. If the decision result in the step S212 is YES, a step S213 carries out a write restart operation to resume the data write operation with respect to the optical disk 1 in synchronism with the recorded data already recorded on the optical disk 1, without changing the write rate. The process returns to the step S204 after the step S213, so as to continue the data write operation. Hence, the recording data continuing to the end of the recorded data recorded immediately before the recording was interrupted is recorded so that there is no discontinuity with the recorded data recorded immediately before the recording was interrupted.

On the other hand, if the decision result in the step S212 is NO, a step S214 reduces the write rate by one step, and the process advances to the step S213. The step S213 carries out a write restart operation to resume the data write operation with respect to the optical disk 1 in synchronism with the recorded data already recorded on the optical disk 1, with the reduced write rate. The process returns to the step S204 after the step S213, so as to continue the data write operation. Hence, the recording data continuing to the end of the recorded data recorded immediately before the recording was interrupted is recorded so that there is no discontinuity with the recorded data recorded immediately before the recording was interrupted.

Therefore, the write operation (data recording) is carried out at the initially set write rate (recording rate) until the high temperature detection number during the data recording reaches the predetermined number. For this reason, the write rate is not changed unnecessarily every time the high temperature is detected, and the write time will not become unnecessarily long.

By reducing the recording rate in steps when the high temperature state is detected a predetermined number of times or more during the data recording, the recording rate will not be greatly reduced. Hence, it is possible to carry out a stable data recording at a speed which is high as possible, while eliminating the cause which consecutively generates the high temperature state.

Further, the present invention is not limited to these embodiments, but various variations and modifications may be made without departing from the scope of the present invention.

What is claimed is:

1. An information storage apparatus for recording, reproducing and/or erasing information with respect to a recording medium, comprising:
a shock and vibration detecting part configured to detect at least one of shock and vibration applied with respect to the information storage apparatus;
a data recording resuming part configured to temporarily interrupt a data recording with respect to the recording medium when the shock and vibration detecting part detects said at least one of shock and vibration while recording data on the recording medium, and to synchronize recording data to recorded data already recorded on the recording medium, and resume recording of the recording data continuing without a discontinuity to an end of the recorded data recorded immediately before the interruption of the data recording when the shock and vibration detecting part no longer detects said at least one of shock and vibration; and
a control part configured to resume the recording of the recording data at a recording rate identical to a recording rate immediately before the recording is interrupted if the number of times said at least one of shock and vibration is detected by the shock and vibration detecting part is less than a predetermined number, and to change the recording rate so as not to generate said at least one of shock and vibration if the number of times said at least one of shock and vibration is detected is greater than or equal to the predetermined number, when resuming the recording by the data recording resuming part.

2. The information storage apparatus as claimed in claim 1, wherein the shock and vibration detecting part includes a part configured to detect said at least one of shock and vibration based on a tracking error signal.

3. The information storage apparatus as claimed in claim 1, wherein the shock and vibration detecting part includes a part configured to detect said at least one of shock and vibration based on a focus error signal.

4. The information storage apparatus as claimed in claim 1, wherein the shock and vibration detecting part includes a part configured to detect said at least one of shock and vibration based on a reflectivity detection signal.

5. An information storage apparatus for recording, reproducing and/or erasing information with respect to a recording medium, comprising:
shock and vibration detecting means for detecting at least one of shock and vibration applied with respect to the information storage apparatus;
data recording resuming means for temporarily interrupting a data recording with respect to the recording medium when the shock and vibration detecting means detects said at least one of shock and vibration while recording data on the recording medium, and for synchronizing recording data to recorded data already recorded on the recording medium, and resuming recording of the recording data continuing without a discontinuity to an end of the recorded data recorded immediately before the interruption of the data recording when the shock and vibration detecting means no longer detects said at least one of shock and vibration; and
control means for resuming the recording of the recording data at a recording rate identical to a recording rate immediately before the recording is interrupted if the number of times said one of shock and vibration is detected by the shock and vibration detecting means is less than a predetermined number, and for changing the recording rate so as not to generate said at least one of shock and vibration if the number of times said at least one of shock and vibration is detected is greater than or equal to the predetermined number, when resuming the recording by the data recording resuming means.

* * * * *